(12) United States Patent
Hallenbeck

(10) Patent No.: US 7,762,218 B2
(45) Date of Patent: Jul. 27, 2010

(54) INTERNAL COMBUSTION ENGINE USING COMBUSTIBLE GASES PRODUCED BY THE ELECTROLYSIS OF WATER, AND VEHICLE COMPRISING SAME

(75) Inventor: John R. Hallenbeck, Tucson, AZ (US)

(73) Assignee: Advanced R F Designs, L.L.C., Tucson, AZ (US)

( * ) Notice: Subject to any disclaimer, the term of this patent is extended or adjusted under 35 U.S.C. 154(b) by 428 days.

(21) Appl. No.: 11/938,339

(22) Filed: Nov. 12, 2007

(65) Prior Publication Data

US 2009/0120414 A1    May 14, 2009

(51) Int. Cl.
*F02B 43/08*    (2006.01)
(52) U.S. Cl. ..................................... 123/3; 123/DIG. 12
(58) Field of Classification Search ...................... 123/2, 123/3, DIG. 12, 1 A
See application file for complete search history.

(56) References Cited

U.S. PATENT DOCUMENTS

| 2,986,133 | A | 5/1961 | Mattson |
| 3,608,660 | A | 9/1971 | Smith et al. |
| 4,605,604 | A | 8/1986 | Pollack et al. |
| 5,105,773 | A | 4/1992 | Cunningham et al. |
| 5,679,236 | A | 10/1997 | Poschl |
| 6,054,844 | A | 4/2000 | Frank |

*Primary Examiner*—Noah Kamen
(74) *Attorney, Agent, or Firm*—Dale D. Regelman; Quarles & Brady LLP

(57) ABSTRACT

An engine system comprising an electrolysis apparatus interconnected to an internal combustion engine. The electrolysis apparatus cleaves water into a mixture of hydrogen gas and oxygen gas. The mixture of hydrogen gas and oxygen gas is input into, and fuels, the internal combustion engine. A vehicle comprising the engine system.

25 Claims, 17 Drawing Sheets

INTERNAL COMBUSTION ENGINE USING COMBUSTIBLE GASES PRODUCED BY THE ELECTROLYSIS OF WATER, AND VEHICLE COMPRISING SAME

FIELD OF THE INVENTION

The invention is directed to an internal combustion engine using combustible gases produced by the electrolysis of water, and a vehicle comprising same.

BACKGROUND OF THE INVENTION

Modern societies are critically dependent on energy. All aspects of modern life, ranging from the generation of electricity to the powering of automobiles, require the consumption of energy.

The desired attributes of any fuel or energy source include low cost, plentiful supply, renewability, safety, and environmental compatibility. Hydrogen is currently the best prospect for these desired attributes and offers the potential to greatly reduce dependence on conventional fossil fuels. Hydrogen is the most prevalent element in the universe and, if realized, offers an inexhaustible fuel source to meet today's increasing energy demands.

In addition to being plentiful and widely available, hydrogen is also a clean fuel source. Combustion of hydrogen produces water as a by-product. Utilization of hydrogen as a fuel source thus avoids the unwanted generation of the carbon and nitrogen-based greenhouse gases that are responsible for global warming as well as the unwanted production of soot and other carbon-based pollutants in industrial manufacturing. Hydrogen truly is a green energy source. The use of hydrogen as an energy source has been limited by the large energy consumption for its production from water, as illustrated in Equation (i).

$$2H_2O \rightarrow 2H_2 + O_2 \qquad (i)$$

As a general matter, prior art electrolyzers consume 4.0 kWh per cubic meter of hydrogen gas produced. Prior art electrolysis apparatus and methods utilize a voltage of 1.6-2.0 V and current strength of dozens and hundreds of amperes.

SUMMARY OF THE INVENTION

Applicant's invention comprises an engine system comprising an electrolysis apparatus interconnected to an internal combustion engine. The electrolysis apparatus cleaves water into a mixture of hydrogen gas and oxygen gas. The mixture of hydrogen gas and oxygen gas is input into, and fuels, the internal combustion engine.

Applicant's electrolysis apparatus comprises an enclosure comprising a bottom, a plurality of walls attached to said bottom and having distal ends extending upwardly therefrom, and a top assembly removeably attached to each of the distal ends of said plurality of walls, wherein said bottom, plurality of walls, and top define an enclosed space; a first electrode disposed within said enclosed space; a second electrode disposed within said enclosed space; at least one electromagnetic energy radiator disposed within said enclosed space; an oscillator disposed external to said enclosure, wherein said oscillator is interconnected to said electromagnetic energy radiator; and a gas outlet in communication with and extending outwardly from said enclosure.

Applicant's internal combustion engine comprises one or more combustion chambers; one or more pistons, wherein each of said one or more pistons is moveably disposed in a different one of said one or more combustion chambers; a crankshaft operatively coupled to each of said one or more pistons; a fuel intake manifold interconnected with said of said plurality of combustion cylinders; a fuel input assembly interconnected with said fuel intake manifold; a conduit interconnecting said gas outlet and said fuel input assembly; a first electrical power system operatively coupled to said crankshaft, wherein said first electrical power system is interconnected with said oscillator; a second electrical power system operatively coupled to said crankshaft, wherein said second electrical power system is interconnected with said first electrode such that said first electrode comprises a cathode, and wherein said second electrical power system is interconnected with said second electrode such that said second electrode comprises an anode.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1A:
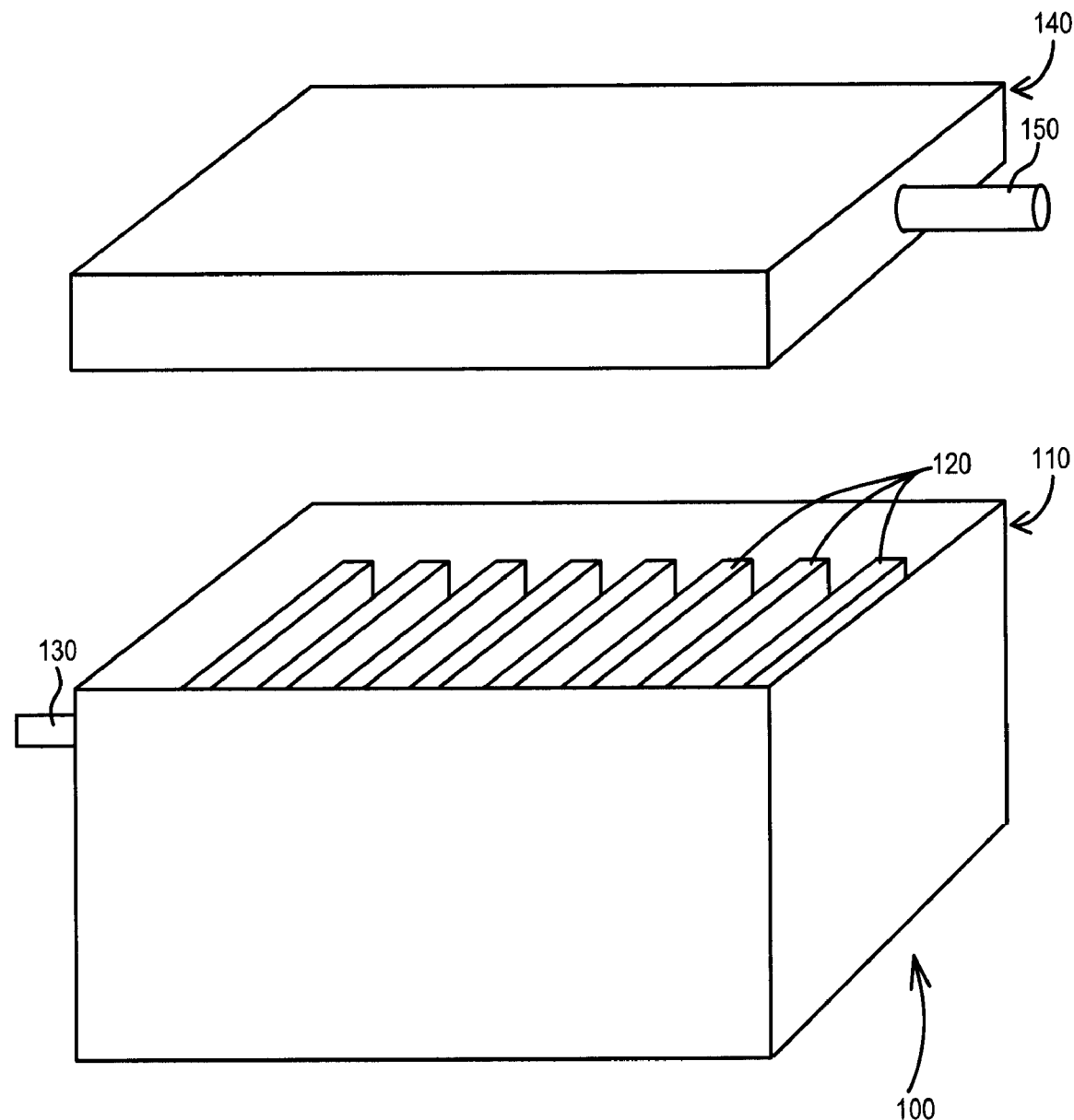
FIG. 1A is a perspective view of a first embodiment of Applicant's electrolysis apparatus, wherein the top assembly is shown removed from a five-sided housing.

The disclosure of U.S. patent application Ser. No. 11/598, 941, filed Nov. 13, 2006, is incorporated in its entirety herein by reference. Referring now to FIG. 1A, Applicant's electrolysis apparatus 100 comprises housing 110 in combination with top assembly 140. Housing 110 comprises water input port 130 and float valve assembly 180 (FIG. 1C). A plurality of electrodes 120 are disposed within housing 110. Water inlet port 130 is interconnected with a source of water, and is positioned such that each of the plurality of electrodes 120 remain covered by water.

In the illustrated embodiment of FIG. 1A, plurality of electrodes 120 comprises 8 electrodes. In other embodiments, plurality of electrodes 120 comprises fewer than 8 electrodes. In still other embodiments, plurality of electrodes 120 comprises more than 8 electrodes.

Top assembly 140 comprises gas outlet 150. The mixture of hydrogen gas and oxygen gas formed by the electrolysis of water within apparatus 100 flows outwardly through gas outlet 150. In certain embodiments, one or more gas conduits interconnect gas outlet 150 and one or more gas inlet portions of an internal combustion engine.

Figure 1B:
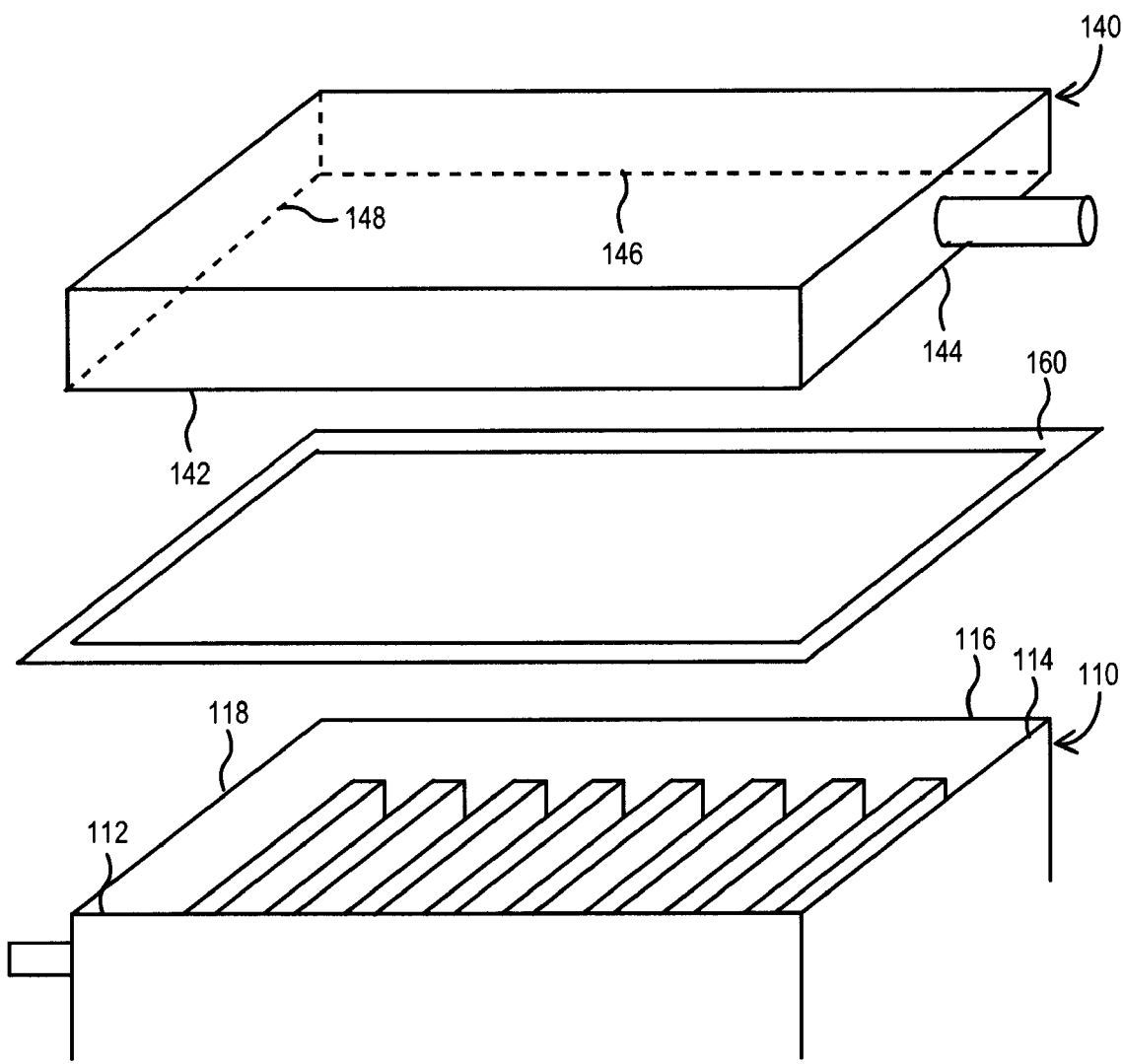
FIG. 1B is a perspective view of a second embodiment of Applicant's electrolysis apparatus which comprises a sealing gasket disposed between the top assembly and the housing.
Figure 1C:
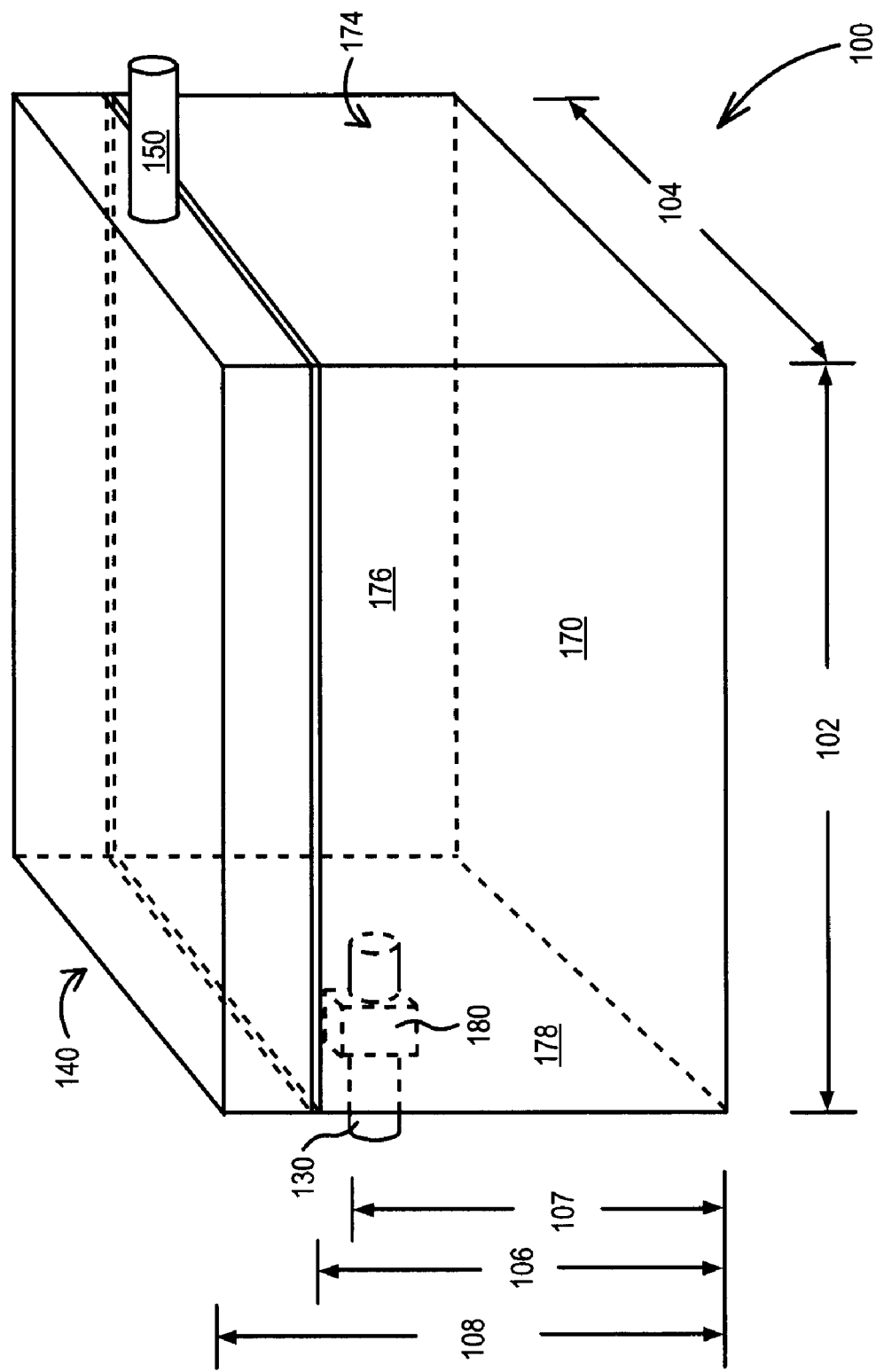
FIG. 1C is a perspective view of the embodiment of FIG. 2 showing the top assembly removeably attached to the housing to form an enclosure defining an enclosed space.

Referring now to FIG. 1B, top assembly 140 can be releasably attached to housing 110 to form a water-tight seal. In certain embodiments, a sealing gasket 160 is disposed between top edges 112, 114, 116, and 118, of housing 110 and bottom edges 142, 144, 146, and 148, of top assembly 140.

Referring now to FIG. 1C, walls 172, 174, 176, and 178, are attached to bottom 170 and extend upwardly therefrom. Top assembly is removeably attachable to the distal ends 112, 114, 116, and 118, of walls 172, 174, 176, and 178, respectively. Bottom 170, wall 172, wall 174, wall 176, wall 178, and top assembly 140, in combination define an enclosed space.

In certain embodiments, bottom 170, and walls 172, 174, 176, 178, are formed from one or more rigid materials selected from the group consisting of wood, ceramic, metal, glass, and combinations thereof. In certain embodiments, bottom 170, and walls 172, 174, 176, 178, are formed from one or more polymeric materials such as and without limitation polyethylene, polypropylene, polystyrene, polycarbonate, polyetheretherketone, mixtures thereof, and the like.

In the illustrated embodiment of FIGS. 1A, 1B, and 1C, apparatus 100 comprises four walls interconnecting the bottom and top assembly. As a general matter, Applicant's apparatus 100 comprises 3 or more walls interconnecting a bottom and a top to define an enclosed space. In certain embodiments, that enclosed space comprises a volume of 1 cubic foot. In other embodiments, that enclosed space comprises a volume less than 1 cubic foot. In still other embodiments, that enclosed space comprises a volume greater than 1 cubic foot.

In the illustrated embodiment of FIG. 1C, Applicant's apparatus 100 comprises a length 102, width 104, and height 108. As a general matter, length 102, width 104, and height 108, are substantially equal. By "substantially equal," Applicant means the same plus or minus about ten percent (10%).

In embodiments wherein Applicant's apparatus 100 provides fuel for an internal combustion engine disposed in a wheeled vehicle, length 102 is between about 12 inches and about 16 inches, width 104 is between about 12 inches and about 16 inches, and height 108 is between about 12 inches and about 16 inches. In these embodiments, housing 110 comprises length 102, width 104, and height 106, wherein height 106 is between about 8 inches and about 12 inches.

The top of water input port 130 is disposed a distance 107 from bottom 170. Float valve assembly 180 maintains the level of water disposed within apparatus 100 at a depth equal to distance 107 from the bottom 170. In certain embodiments, distance 107 is [(0.9)×(height 106)]. For example, in certain embodiments height 106 is about 8 inches and distance 107 is about 7 inches.

Figure 2A:
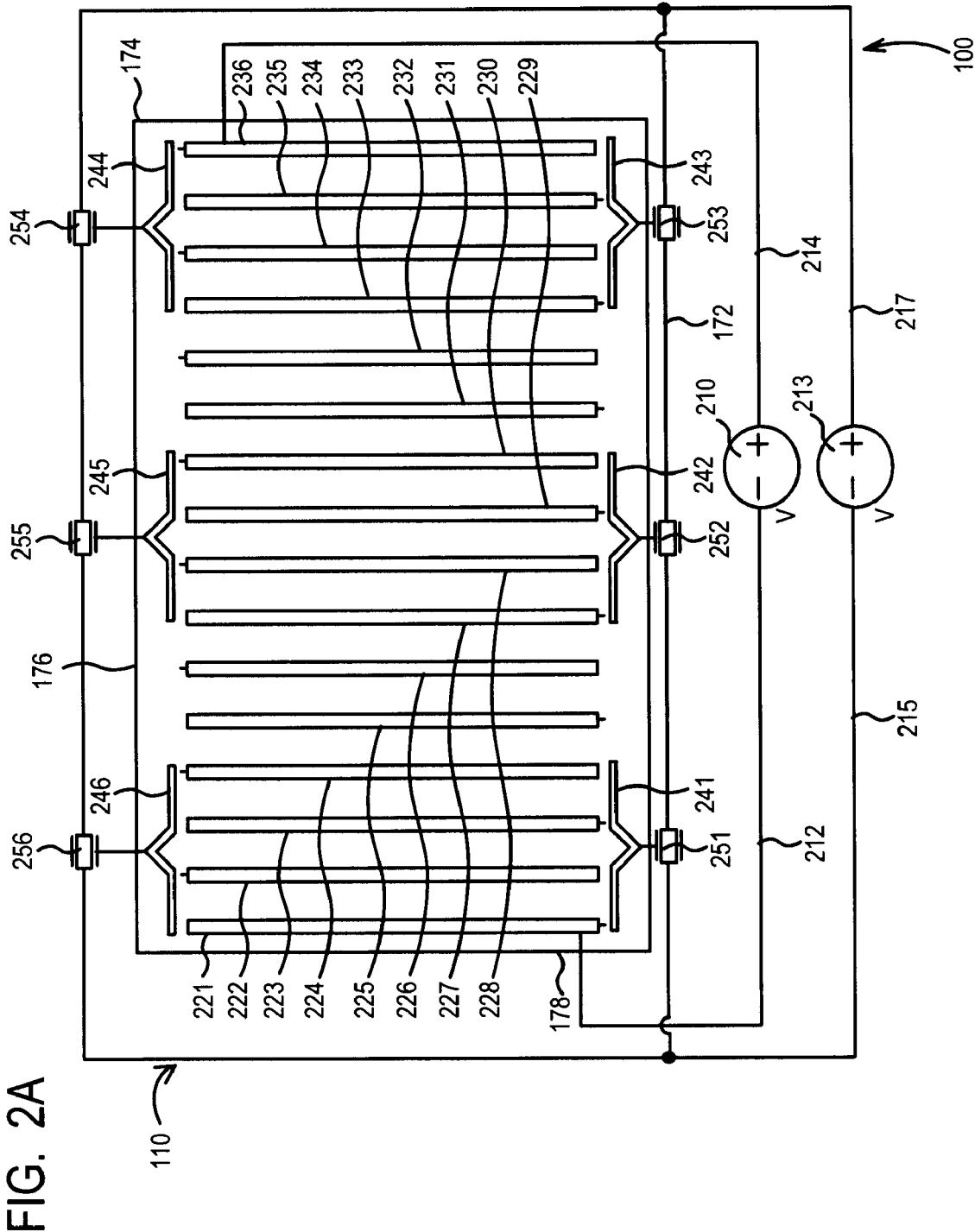
FIG. 2A is a top view of a third embodiment of Applicant's electrolysis apparatus, wherein the top assembly has been removed.

In the illustrated embodiment of FIG. 2A, the plurality of electrodes 120 (FIG. 1) comprises electrodes 221, 222, 223, 224, 225, 226, 227, 228, 229, 230, 231, 232, 233, 234, 235, and 236. In certain embodiments, each of electrodes 221, 222, 223, 224, 225, 226, 227, 228, 229, 230, 231, 232, 233, 234, 235, and 236, is formed from a material selected from the group consisting of lead, copper, tin, nickel, and combinations thereof.

In certain embodiments, one or more of the plurality of electrodes comprises Nickel (II) hydroxide. In certain embodiments, one or more of the plurality of electrodes comprises Nickel (III) oxide-hydroxide.

Applicant's apparatus 100 further comprises first power source 210. In certain embodiments, first power source 210 provides DC power having a voltage $V_{DC}$ between about 8 volts and about 48 volts to at least one anode electrode and to at least one cathode electrode. In certain embodiments, first power source 210 provides 36 $V_{DC}$ power to at least one anode electrode and to at least one cathode electrode.

In the illustrated embodiment of FIG. 2A, power conduit 212 interconnects first power source 210 with electrode 221 such that electrode 221 comprises a cathode. Power conduit 214 interconnects first power source 210 with electrode 236 such that electrode 236 comprises an anode.

As a general matter, Applicant's electrolysis apparatus 100 comprises (N) electromagnetic energy radiators, wherein (N) is greater than or equal to 1 and less than or equal to 12, and wherein in operation each of those (N) electromagnetic energy radiators emits electromagnetic energy comprising a different frequency. In the illustrated embodiment of FIG. 2A, Applicant's electrolysis apparatus 100 comprises six electromagnetic energy radiators, namely electromagnetic energy radiators 241, 242, 243, 244, 245, and 246.

In the illustrated embodiment of FIG. 2A, electromagnetic energy radiators 241, 242, and 243, are disposed adjacent to wall 172. In the illustrated embodiment of FIG. 2A, electromagnetic energy radiators 244, 245, and 246, are disposed adjacent to wall 176. In other embodiments, one or more electromagnetic energy radiators each comprise a portion of one or more of the plurality of walls of apparatus 100. For example, in certain embodiments wherein one or more of walls 172, 174, 176, and/or 178, are formed from one or more non-electrically-conducting materials, one or more electromagnetic radiators are disposed in wall 172, and/or wall 174, and/or wall 176, and/or wall 178.

In certain embodiments, one or more of Applicant's (N) electromagnetic energy radiators are formed from a metal selected from the group consisting of iron, copper, zinc, nickel, lead, tin, and combinations thereof. In certain embodiments, one or more of Applicant's (N) electromagnetic energy radiators comprise zinc.

In the illustrated embodiment of FIG. 2A, electromagnetic energy radiator 241 is interconnected with oscillator 251, wherein oscillator 251 provides first energy comprising a first frequency and a first power level. In certain embodiments, oscillator 251 further comprises a power amplifier portion. In certain embodiments, the first power level is between about 1 watt and about 1000 watts. In certain embodiments, the first power level is about 600 watts.

Electromagnetic energy radiator 242 is interconnected with oscillator 252, wherein oscillator 252 provides second energy comprising a second frequency and a second power level. In certain embodiments, oscillator 252 further comprises a power amplifier portion. In certain embodiments, the second power level is between about 1 watt and about 1000 watts. In certain embodiments, the second power level is about 600 watts.

Electromagnetic energy radiator 243 is interconnected with oscillator 253, wherein oscillator 253 provides third energy comprising a third frequency and a third power level. In certain embodiments, oscillator 253 further comprises a power amplifier portion. In certain embodiments, the third power level is between about 1 watt and about 1000 watts. In certain embodiments, the third power level is about 600 watts.

Electromagnetic energy radiator 244 is interconnected with oscillator 254, wherein oscillator 254 provides fourth energy comprising a fourth frequency and a fourth power level. In certain embodiments, oscillator 254 further comprises a power amplifier portion. In certain embodiments, the fourth power level is between about 1 watt and about 1000 watts. In certain embodiments, the fourth power level is about 600 watts.

Electromagnetic energy radiator 245 is interconnected with oscillator 255, wherein oscillator 255 provides fifth energy comprising a fifth frequency and a fifth power level. In certain embodiments, oscillator 255 further comprises a power amplifier portion. In certain embodiments, the fifth power level is between about 1 watt and about 1000 watts. In certain embodiments, the fifth power level is about 600 watts.

Electromagnetic energy radiator 246 is interconnected with oscillator 256, wherein oscillator 256 provides sixth energy comprising a sixth frequency and a sixth power level. In certain embodiments, oscillator 256 further comprises a power amplifier portion. In certain embodiments, the sixth power level is between about 1 watt and about 1000 watts. In certain embodiments, the sixth power level is about 600 watts.

In certain embodiments, oscillators 251, 252, 253, 254, 255, and 256, comprise a single device, in optional combination with a power amplifier, wherein that single device is capable of providing a plurality of outputs each comprising a different frequency, wherein each of those plurality of outputs comprises substantially the same power level.

In the illustrated embodiment of FIG. 2A, oscillators 251, 252, 253, 254, 255, and 256, receive power from second electrical source via power conduits 215 and 217. In certain embodiments, second power source 213 provides DC power having a voltage $V_{DC}$ between about 8 volts and about 48 volts to one or more oscillators, wherein those one or more oscillators are each interconnected to a different electromagnetic energy radiator disposed within apparatus 100. In certain embodiments, second power source 213 provides 12 $V_{DC}$ power to one or more oscillators, wherein those one or more oscillators are each interconnected to a different electromagnetic energy radiator disposed within apparatus 100.

In certain embodiments, the first power level, second power level, third power level, fourth power level, fifth power level, and sixth power level, are substantially the same. By "substantially the same," Applicant means within about plus or minus ten percent. In certain embodiments, the first power level, second power level, third power level, fourth power level, fifth power level, and sixth power level, are not substantially the same.

In certain embodiments, the first frequency, second frequency, third frequency, fourth frequency, fifth frequency, and sixth frequency, are substantially the same. In certain embodiments, the first frequency, second frequency, third frequency, fourth frequency, fifth frequency, and sixth frequency, are not substantially the same. In certain embodiments, using the configuration shown in FIG. 2A electromagnetic energy radiators 241, 242, 243, 244, 245, and 246, emit electromagnetic radiation comprising frequencies of 620 Hz, 630, Hz, 12,000 Hz, 42,800 Hz, 48,800 Hz, and 100,000 Hz, respectively.

Figure 2B:
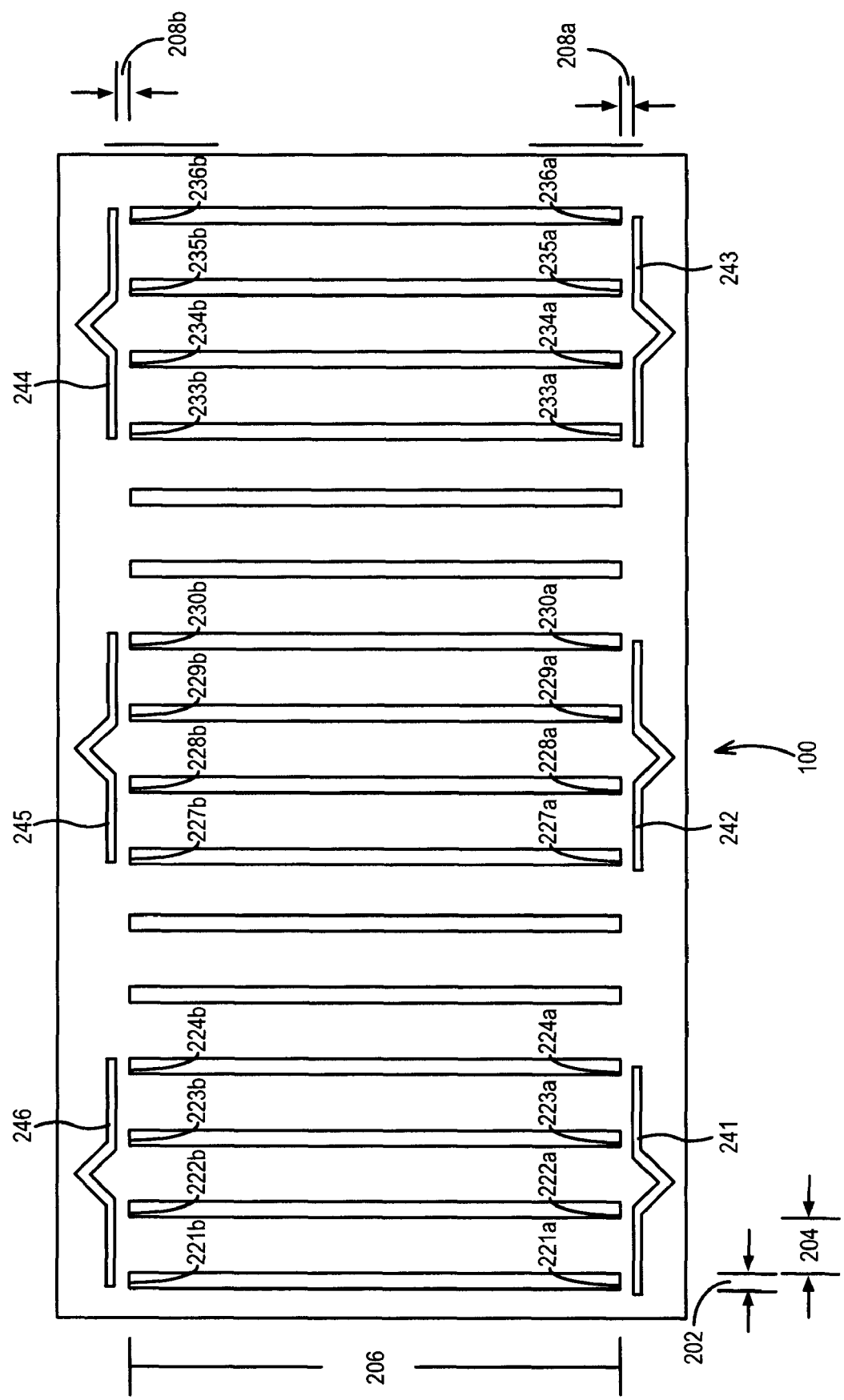
FIG. 2B is a top view showing a portion of the apparatus of FIG. 2A.

Referring now to FIG. 2B, each electrode 221, 222, 223, 224, 227, 228, 229, 230, 233, 234, 235, and 236, comprises a length 206 and width 202. In certain embodiments, length 206 is between about 6 inches and about 8 inches. As a general matter, length 206 is about $[(0.5) \times (\text{width } 104)]$. In certain embodiments, width 202 is between about 0.1 inches and about 0.3 inches. Electrodes 221, 222, 223, 224, 227, 228, 229, 230, 233, 234, 235, and 236, comprise a height that is less than or equal to distance 107 (FIG. 1C).

Each electrode 221, 222, 223, 224, 227, 228, 229, 230, 233, 234, 235, and 236, is separated from the one or two adjacent electrodes by a gap 204. In certain embodiments, gap 204 is between about 0.2 and about 0.6 inches. As a general matter, the gap 204 is greater than or equal to width 202 and less than or equal to $[2 \times \text{width } 202]$.

In the illustrated embodiment of FIG. 2B, gap 208a separates electromagnetic energy radiator 241 from electrode ends 221a, 222a, 223a, and 224a. Gap 208a separates electromagnetic energy radiator 242 from electrode ends 227a, 228a, 229a, and 230a. Gap 208a separates electromagnetic energy radiator 243 from electrode ends 233a, 234a, 235a, and 236a. Gap 208a is between about 0.25 inches and about 0.5 inches.

In the illustrated embodiment of FIG. 2B, gap 208b separates electromagnetic energy radiator 246 from electrode ends 221b, 222b, 223b, and 224b. Gap 208b separates electromagnetic energy radiator 245 from electrode ends 227b, 228b, 229b, and 230b. Gap 208b separates electromagnetic energy radiator 244 from electrode ends 233b, 234b, 235b, and 236b. Gap 208b is between about 0.25 inches and about 0.5 inches.

In certain embodiments, gap 208a and gap 208b are substantially the same. In other embodiments, gap 208a and gap 208b are not substantially the same.

Figure 3:
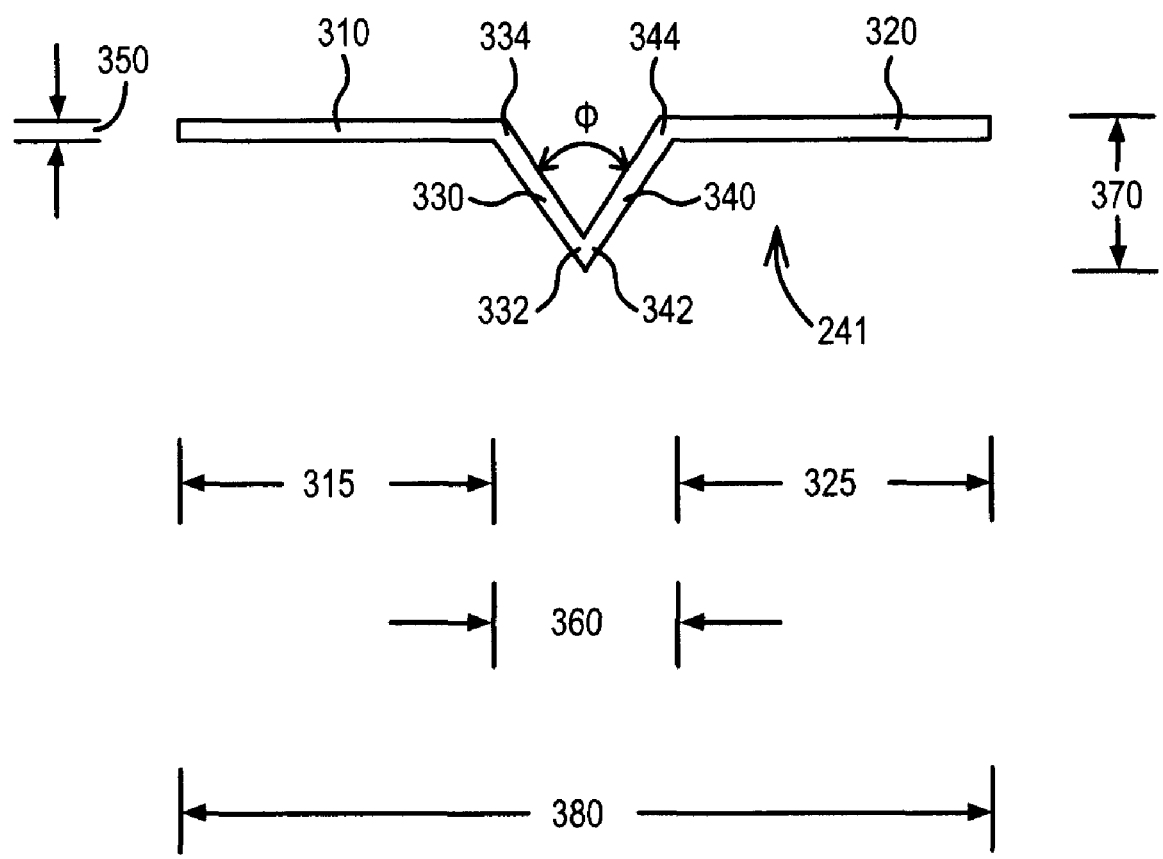
FIG. 3 is a top view of one embodiment of Applicant's electromagnetic energy radiator.

Referring now to FIG. 3, electromagnetic energy radiator 241 comprises a central V-shaped portion formed from members 330 and 340, wherein end portion 332 of member 330 is attached to end portion 342 of member 340, such that members 330 and 340 define a dihedral angle Φ, wherein angle Φ is between about 30 degrees and about 45 degrees.

Member 310 is attached to end portion 334 of member 330, and extends outwardly therefrom. Member 320 is attached to end portion 344 of member 340, and extends outwardly therefrom. Member 310 comprises a length 315, wherein length 315 is between about 1 inches and about 5 inches. Member 320 comprises a length 325, wherein length 325 is between about 1 inches and about 5 inches.

In certain embodiments, length 315 is about [(2×width 202)+gap 204]. In certain embodiments, length 325 is about [(2×width 202)+gap 204]. In certain embodiments, length 315 and length 325 are substantially the same. In other embodiments, length 315 and length 325 are not substantially the same.

The afore-described V-shaped portion comprising members 330 and 340 comprises length 360, wherein length 360 is between about 0.5 inches and about 2 inches. In certain embodiments, length 360 is about [0.5×length 315].

Electromagnetic energy radiator 241 comprises a width 370. In certain embodiments, width 370 is between about 1 inches and about 3 inches. In certain embodiments, width 370 is about 0.5 times length 315.

Electromagnetic energy radiator 241 comprises an overall length 380 equal to [length 315+length 325+length 360]. In certain embodiments, overall length 380 equals [(4×width 202)+(3×gap 204)].

Figure 4:
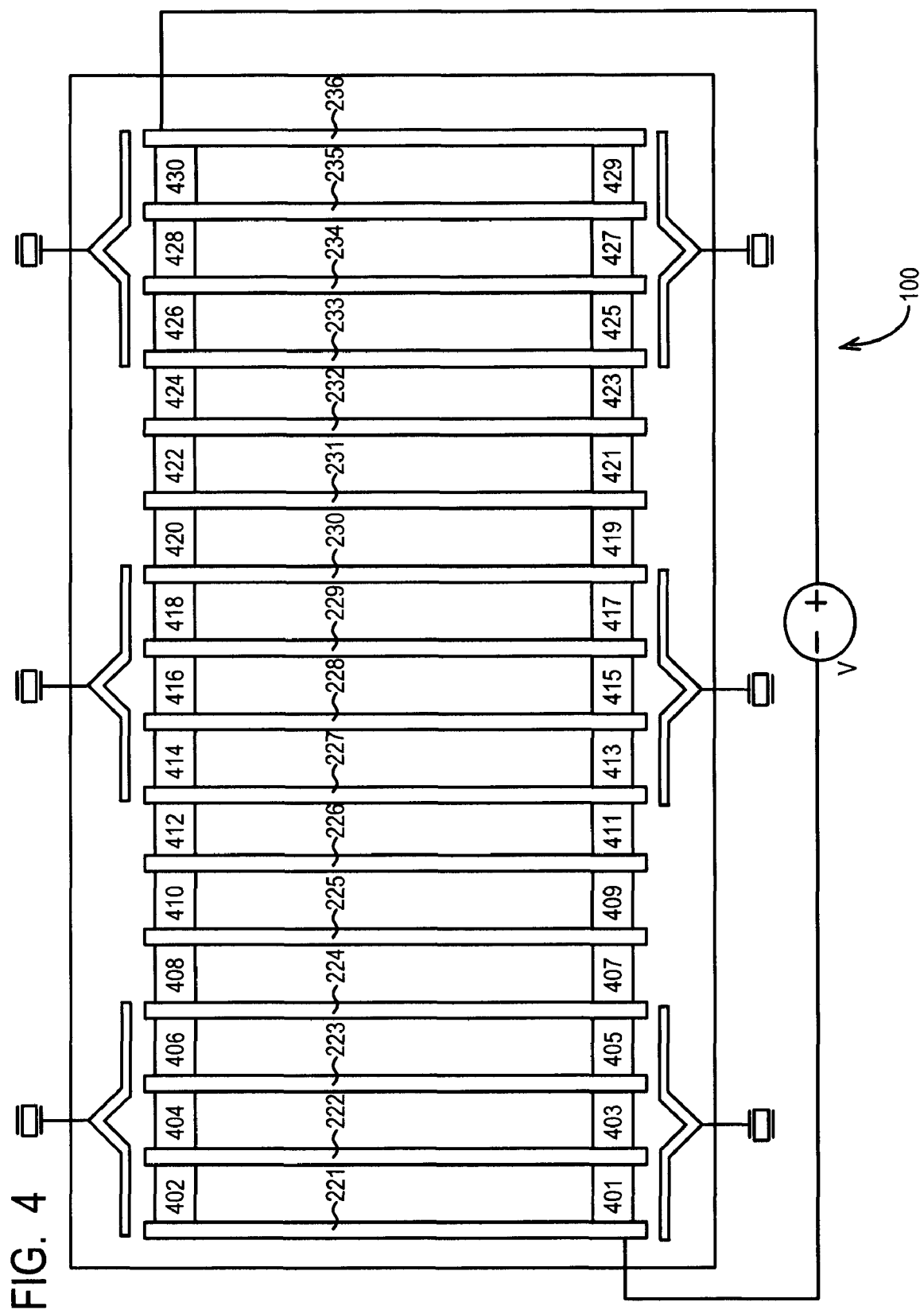
FIG. 4 is a top view of a fourth embodiment of Applicant's electrolysis apparatus, wherein the top assembly has been removed.

In certain embodiments, the plurality of electrodes are separated from adjacent electrodes by a plurality of electrically insulating spacers. For example and referring now to FIG. 4, electrodes 221 and 222 are separated by electrically-insulating spacers 401 and 402. Electrodes 222 and 223 are separated by electrically-insulating spacers 403 and 404. Electrodes 223 and 224 are separated by electrically-insulating spacers 405 and 406. Electrodes 224 and 225 are separated by electrically-insulating spacers 407 and 408. Electrodes 225 and 226 are separated by electrically-insulating spacers 409 and 410. Electrodes 226 and 227 are separated by electrically-insulating spacers 411 and 412. Electrodes 227 and 228 are separated by electrically-insulating spacers 413 and 414. Electrodes 228 and 229 are separated by electrically-insulating spacers 415 and 416. Electrodes 229 and 230 are separated by electrically-insulating spacers 417 and 418. Electrodes 230 and 231 are separated by electrically-insulating spacers 419 and 420. Electrodes 231 and 232 are separated by electrically-insulating spacers 421 and 422. Electrodes 232 and 233 are separated by electrically-insulating spacers 423 and 424. Electrodes 233 and 234 are separated by electrically-insulating spacers 425 and 426. Electrodes 234 and 235 are separated by electrically-insulating spacers 427 and 428. Electrodes 235 and 236 are separated by electrically-insulating spacers 429 and 430.

In certain embodiments, spacers 401, 402, 403, 404, 405, 406, 407, 408, 409, 410, 411, 412, 413, 414, 415, 416, 417, 418, 419, 420, 421, 422, 423, 424, 425, 426, 427, 428, 429, and 430, each comprise an electrically-insulating material. In certain embodiments, spacers 401, 402, 403, 404, 405, 406, 407, 408, 409, 410, 411, 412, 413, 414, 415, 416, 417, 418, 419, 420, 421, 422, 423, 424, 425, 426, 427, 428, 429, and 430, each comprise a dielectric strength of at least 500 volts per mil. In certain embodiments, spacers 401, 402, 403, 404, 405, 406, 407, 408, 409, 410, 411, 412, 413, 414, 415, 416, 417, 418, 419, 420, 421, 422, 423, 424, 425, 426, 427, 428, 429, and 430, are formed from a material selected from the group consisting of natural rubber, polyisoprene, polyisobutylene, polyimide, and combinations thereof.

Figure 5:
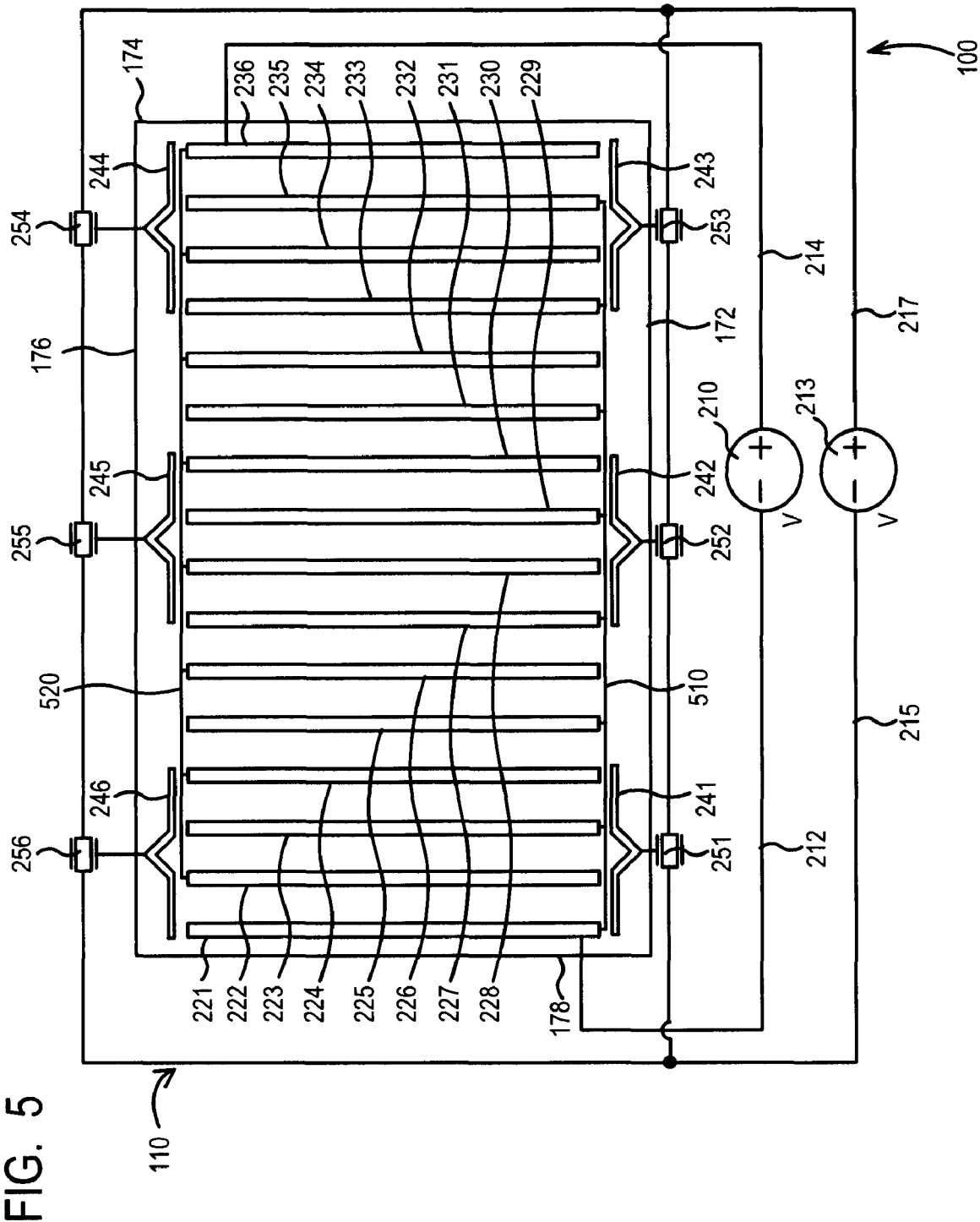
FIG. 5 is a top view of a fifth embodiment of Applicant's electrolysis apparatus, wherein the top assembly has been removed.

Referring now to FIG. 5, electrode 221 is interconnected with first power source 210 by power conduit 212 such that electrode 221 comprises a cathode. In the illustrated embodiment of FIG. 5, power conduit 510 interconnects electrodes 221, 223, 225, 227, 229, 231, 233, and 235, such that electrodes 221, 223, 225, 227, 229, 231, 233, and 235, each comprise a cathode.

Electrode 236 is interconnected with first power source 210 by power conduit 214 such that electrode 236 comprises an anode. In the illustrated embodiment of FIG. 5, power conduit 520 interconnects electrodes 222, 224, 226, 228, 230, 232, 234, and 236, such that electrodes 222, 224, 226, 228, 230, 232, 234, and 236, each comprise an anode.

Figure 6A:
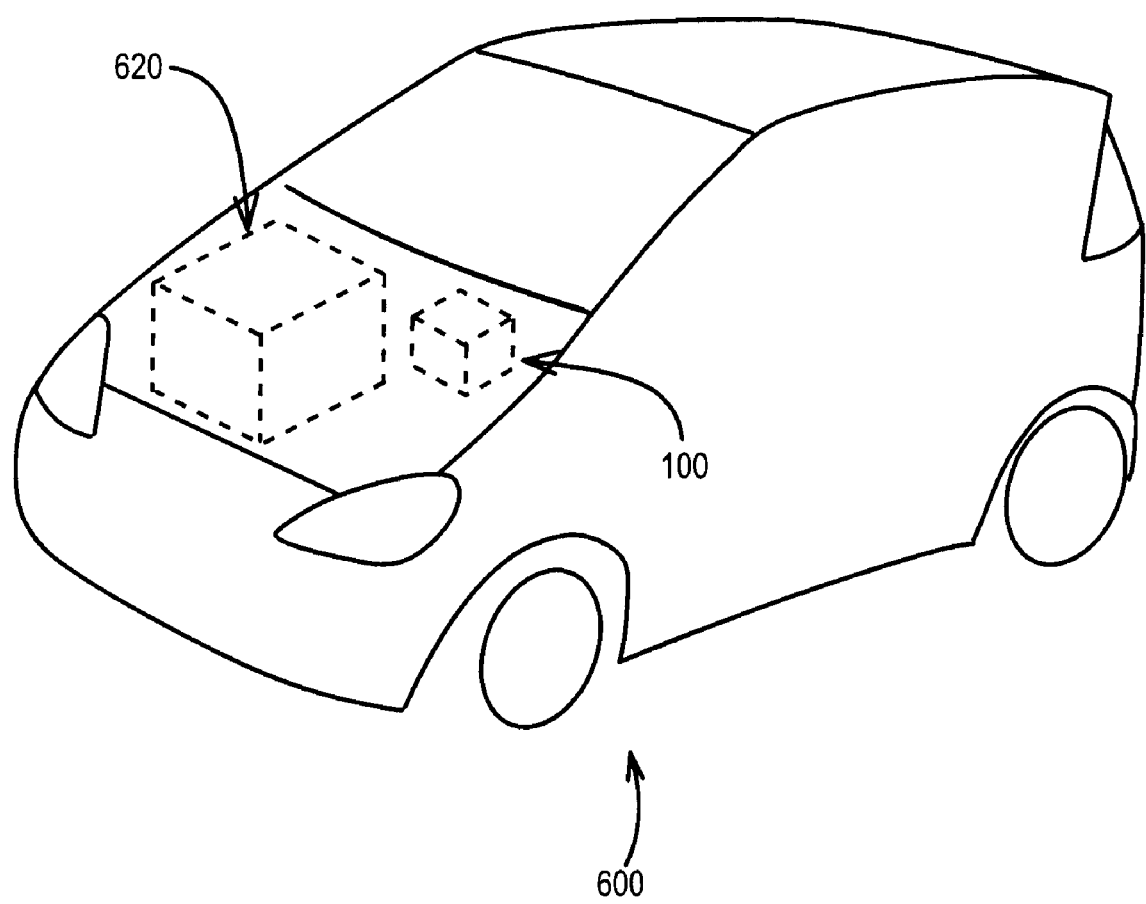
FIG. 6A is a perspective view of a first embodiment of Applicant's vehicle comprising Applicant's electrolysis apparatus and an internal combustion engine.

Applicant's invention further comprises a wheeled-vehicle powered, in whole or in part, by an internal combustion engine which operates using the mixture of combustible gases produced by Applicant's electrolyzer apparatus 100. Referring now to FIG. 6A, vehicle 600 comprises electrolyzer apparatus 100 in combination with internal combustion engine 620. In the illustrated embodiment of FIG. 6A, vehicle 600 comprises a passenger car comprising 4 wheels. In other embodiments, vehicle 600 comprises a van. In other embodiments, vehicle 600 comprises a truck. In other embodiments, vehicle 600 comprises a bus. In other embodiments, vehicle 600 comprises a motorcycle. In other embodiments, vehicle 600 comprises fewer than 4 wheels. In other embodiments, vehicle 600 comprises more than 4 wheels.

Figure 6B:
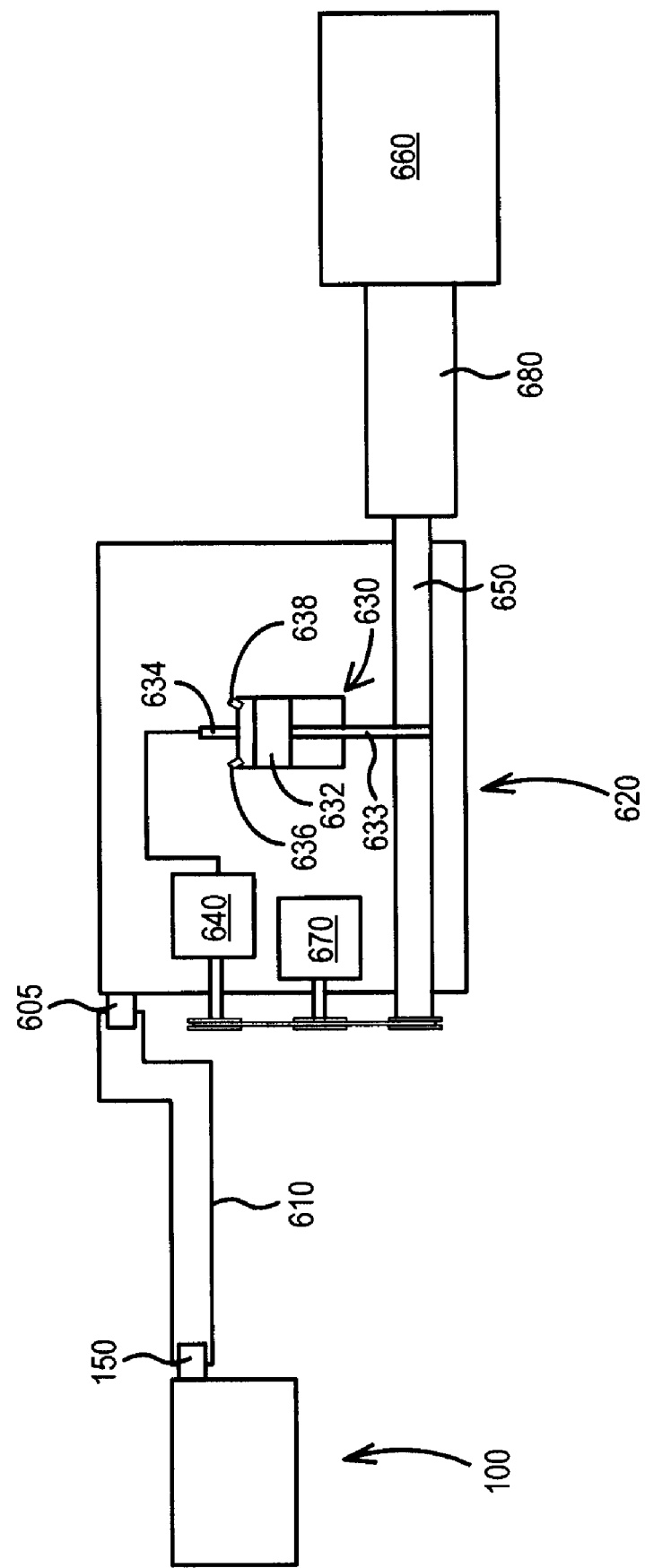
FIG. 6B is a block diagram showing certain of the elements of Applicant's internal combustion engine, wherein that engine is interconnected with Applicant's electrolysis apparatus.

Referring now to FIGS. 6A and 6B, Applicant's vehicle 600 comprises Applicant's electrolyzer apparatus 100, internal combustion engine 620, and transmission 660. In certain embodiments, internal combustion engine 620 is powered only using the mixture of combustible gases produced by electrolyzer 100. In other embodiments, internal combustion engine 620 comprises a hybrid engine powered using the mixture of combustible gases produced by electrolyzer 100 in combination with a mixture of hydrocarbon fuels, wherein those hydrocarbon fuels are selected from the group consisting of methane, propane, gasoline, diesel fuel, bio-diesel fuel, and combinations thereof. In certain embodiments, internal combustion engine 620 comprises a gas turbine engine, a rotary engine, a two stroke engine, a four stroke engine, or a six stroke engine.

Figure 10:
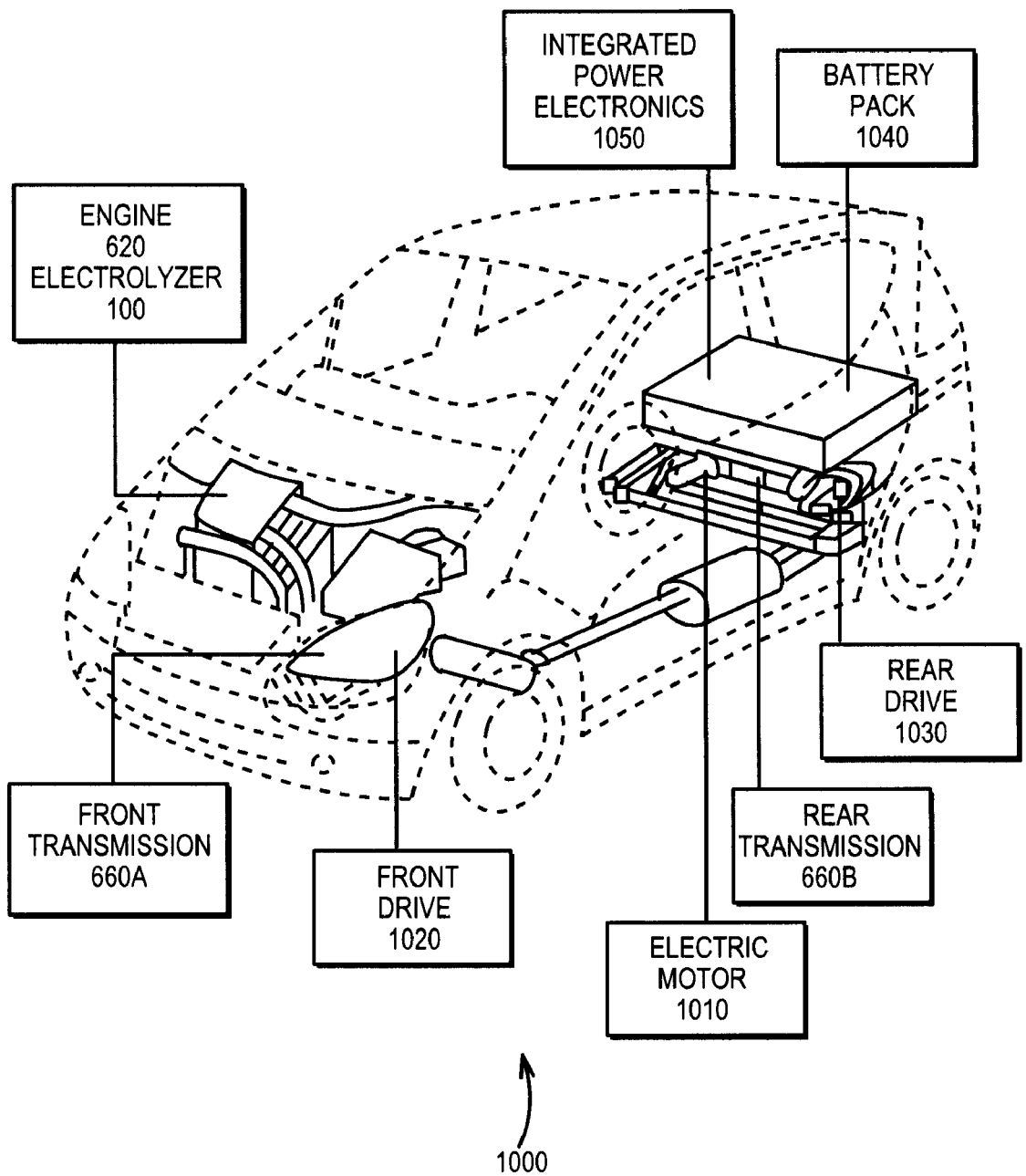
FIG. 10 is a perspective view of a second embodiment of Applicant's vehicle.

Referring now to FIG. 10, in certain embodiments Applicant's vehicle comprises a hybrid vehicle, such as and without limitation hybrid vehicle 1000. In the illustrated embodiment of FIG. 10, Applicant's vehicle 1000 comprises Applicant's electrolyzer apparatus 100, internal combustion engine 620, first transmission 660A, electric motor 1010, battery pack 1040, and second transmission 660B. In certain embodiments, hybrid vehicle 1000 comprises Applicant's hybrid internal combustion engine as described herein.

In certain embodiments, Applicant's vehicle 1000 is started using electric motor 1010. As the quantity of combustible gases produced by electrolyzer 100 increases, Applicant's vehicle 1000 is powered using both the mixture of combustible gases produced by electrolyzer 100 in combination with electric motor 1010.

As those skilled in the art will appreciate, Applicant's vehicle 600 and/or vehicle 1000 may comprise one or more additional elements and systems not shown in FIGS. 6A and 10, respectively. Such additional systems include, without limitation, anti-lock braking systems, pollution control systems, entertainment systems, navigational systems, and the like.

Referring now to FIG. 6B, in certain embodiments Applicant's internal combustion engine 620 comprises a plurality of combustion cylinders 630, wherein each of those cylinders comprises a piston 632 moveably disposed therein, one or more fuel intake valves 636, and one or more exhaust valves 638. In a multi-cylinder engine, the cylinders usually are arranged in one of three ways: inline, "V," or flat (also known as horizontally opposed or boxer).

As those skilled in the art will appreciate, fuel is input into each cylinder 630 via the one or more fuel intake valves 636, that fuel is ignited within the cylinder thereby causing piston assembly 632 to move upwardly and downwardly, wherein each piston assembly is operatively coupled to crankshaft 650. Combustion products resulting from the ignition of the fuel, i.e. "exhaust," is removed from each cylinder via the one or more exhaust valves 638.

In the illustrated embodiment of FIG. 6B, connecting rod 633 interconnects piston 632 with crankshaft 650. Connecting rod 633 can rotate at both ends so that its angle can change as piston 632 moves, and crankshaft 650 rotates. Crankshaft 650 translates the upwardly and downwardly movement of piston 632 into a rotational motion. Linkage 680 interconnects crankshaft 650 and transmission 660, operatively transferring rotational energy from crankshaft 650 to transmission 660.

In the illustrated embodiment of FIG. 6B, output port 150 of electrolyzer 100 is in communication with fuel input assembly 605 via fuel conduit 610. In certain embodiments, fuel conduit 610 is formed from one or more metals, one or more elastomers, one or more rigid plastics, and combinations thereof. Engine 620 comprises a conventional fuel distribution system which includes an fuel intake manifold, wherein that fuel distribution system provides a mixture of combustible gases from fuel input assembly 605 to each of the one or more cylinders 630 via the one or more fuel intake valves 636 disposed in those one or more cylinders.

In certain embodiments, each of the plurality of cylinders 630 further comprises one or more spark plugs 634, wherein those one or more spark plugs 634 provide a timed electrical discharge, wherein that timed electrical discharge ignites a mixture of combustible gases disposed in the cylinder, wherein that mixture of combustible gases are selected from the group consisting of hydrogen at a level exceeding ambient atmospheric levels, oxygen at a level exceeding ambient atmospheric levels, and optionally one or more hydrocarbons at a level exceeding ambient atmospheric levels. As those skilled in the art will appreciate, oxygen is present at about 20.95 volume percent in the ambient atmosphere, hydrogen is present at about 0.00005 volume percent in the ambient atmosphere, and methane is present at about 0.00017 volume percent in the ambient atmosphere. By "at a level exceeding ambient atmospheric levels," Applicant means, for oxygen, at a level of at least 1.5 times the ambient atmospheric level of oxygen described hereinabove. By "at a level exceeding ambient atmospheric levels," Applicant means, for hydrogen, at a level of at least ten thousand times the ambient atmospheric level of hydrogen described methane, at a level of at least ten thousand times the ambient atmospheric level of methane described hereinabove.

In the illustrated embodiment of FIG. 6B, the one or more spark plugs 634 are interconnected with a vehicle electrical system 640. In certain embodiments, vehicle electrical system 640 comprises a generator operatively coupled to crankshaft 650, wherein that generator produces DC power comprising a first voltage. In certain embodiments, that first voltage is selected from the group consisting of about 12 volts, about 24 volts, about 36 volts, and about 48 volts. In certain embodiments, vehicle electrical system 640 comprises an alternator operatively coupled to crankshaft 650, wherein that alternator produces DC power comprising a first voltage. In certain embodiments, that first voltage is selected from the group consisting of about 12 volts, about 24 volts, about 36 volts, and about 48 volts. In certain embodiments, vehicle electrical system 640 comprises one or more batteries capable of storing electrical energy comprising the first voltage. In certain embodiments, vehicle electrical system 640 further comprises one or more voltage regulators.

In the illustrated embodiment of FIG. 6B, engine 620 further comprises vehicle electrical system 670. In certain embodiments, vehicle electrical system 670 comprises a generator operatively coupled to crankshaft 650, wherein that generator produces DC power comprising a second voltage, wherein the second voltage differs from the first voltage. In certain embodiments, that second voltage is selected from the group consisting of about 12 volts, about 24 volts, about 36 volts, and about 48 volts. In certain embodiments, vehicle electrical system 670 comprises an alternator operatively coupled to crankshaft 650, wherein that alternator produces DC power comprising a second voltage, wherein the second voltage differs from the first voltage. In certain embodiments, that second voltage is selected from the group consisting of about 12 volts, about 24 volts, about 36 volts, and about 48 volts. In certain embodiments, vehicle electrical system 670 comprises one or more batteries capable of storing electrical energy comprising the first voltage. In certain embodiments, vehicle electrical system 670 further comprises one or more voltage regulators.

Figure 7A:
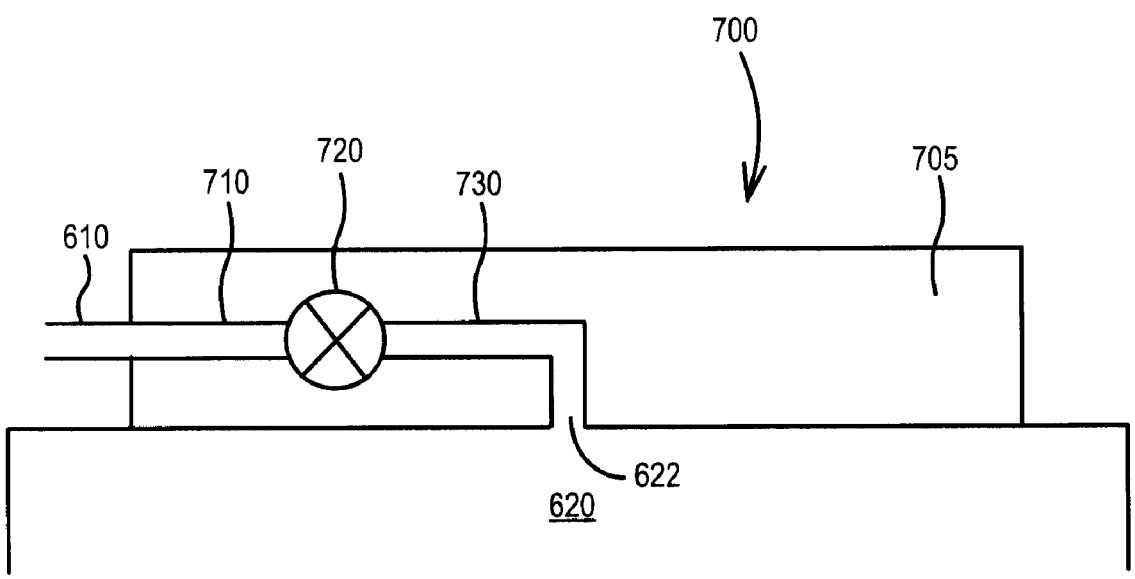
FIG. 7A is a cross-sectional view of a first embodiment of Applicant's fuel input assembly.

Referring now to FIG. 7A, in embodiments wherein Applicant's internal combustion engine utilizes a mixture of combustible gases comprising oxygen and hydrogen at levels in excess of ambient atmospheric levels, but not a mixture of hydrocarbon gases, fuel input assembly 605 comprises assembly 700. In the illustrated embodiment of FIG. 7, fuel input assembly 700 is disposed on a portion of internal combustion engine 620. Fuel input assembly 700 comprises housing 705, combustible gas input conduit 710, valve 720, and combustible gas output conduit 730, wherein output conduit 730 communicates with the fuel intake manifold 622 disposed in engine 620.

In certain embodiments, housing 705 comprises a member formed from one or more metals, wherein that member is formed to comprise conduits 710 and 730 disposed therein. In certain embodiments, fuel input assembly comprises (N) combustible gas input conduits, (N) valves 720, and (N) combustible gas output conduits 730, wherein the (i)th valve 720 interconnects the (i)th combustible gas fuel input conduit and the (i)th combustible gas output conduit, wherein (i)th greater than or equal to 1 and less than or equal to (N). In certain embodiments, (N) is 1. In certain embodiments, (N) is 2. In certain embodiments, (N) is 4. In certain embodiments, (N) is greater than 4.

Figure 7B:
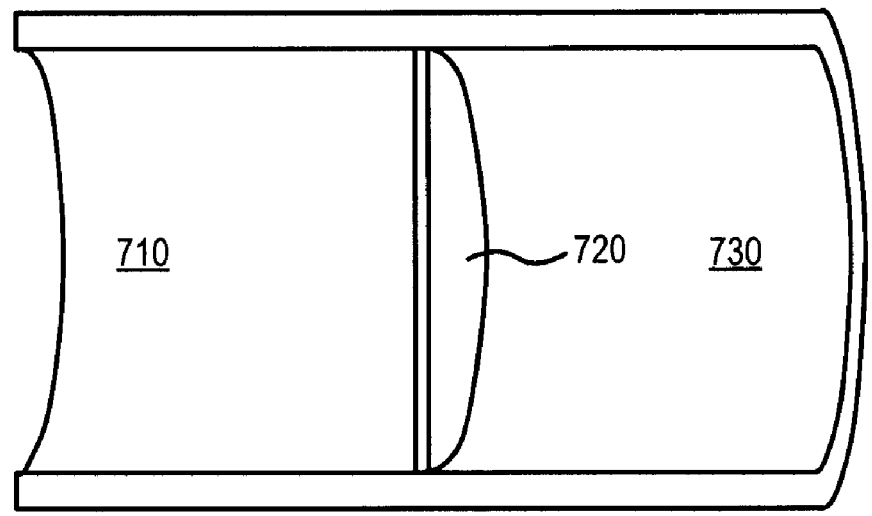
FIG. 7B shows a throttle valve disposed in Applicant's fuel input assembly, wherein the valve is shown in a closed configuration.
Figure 7C:
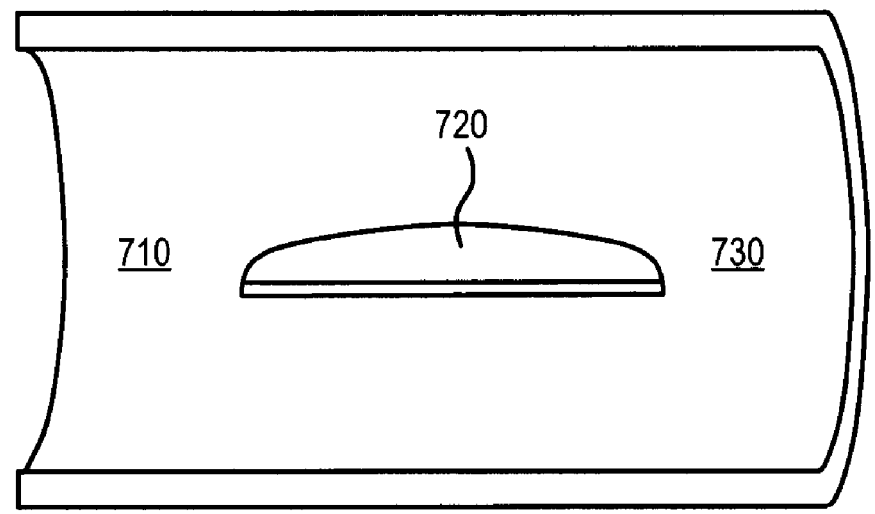
FIG. 7C shows a throttle valve disposed in Applicant's fuel input assembly, wherein the valve is shown in an open configuration.

Referring now to FIGS. 7B and 7C, in certain embodiments each valve 720 comprises a throttle valve. In certain embodiments, fuel input assembly 700 further comprises a throttle position sensor 725 disposed on throttle valve 720.

FIG. 7B shows throttle valve 720 in a closed orientation, wherein the mixture of combustible gases produced by electrolyzer 100 cannot be introduced into engine 620 via fuel input assembly 700. FIG. 7C shows throttle valve 720 in a fully open orientation, wherein a maximum amount of the mixture of combustible gases produced by electrolyzer 100 can be introduced into engine 620 via fuel input assembly 700. As those skilled in the art will appreciate, throttle valve 720 can be adjusted to comprise any orientation intermediate between the orientation of FIG. 7B and the orientation of FIG. 7C, thereby adjusting the amount of the mixture of combustible gases produced by electrolyzer 100 introduced into engine 620 via a fuel input assembly 700.

Figure 7D:
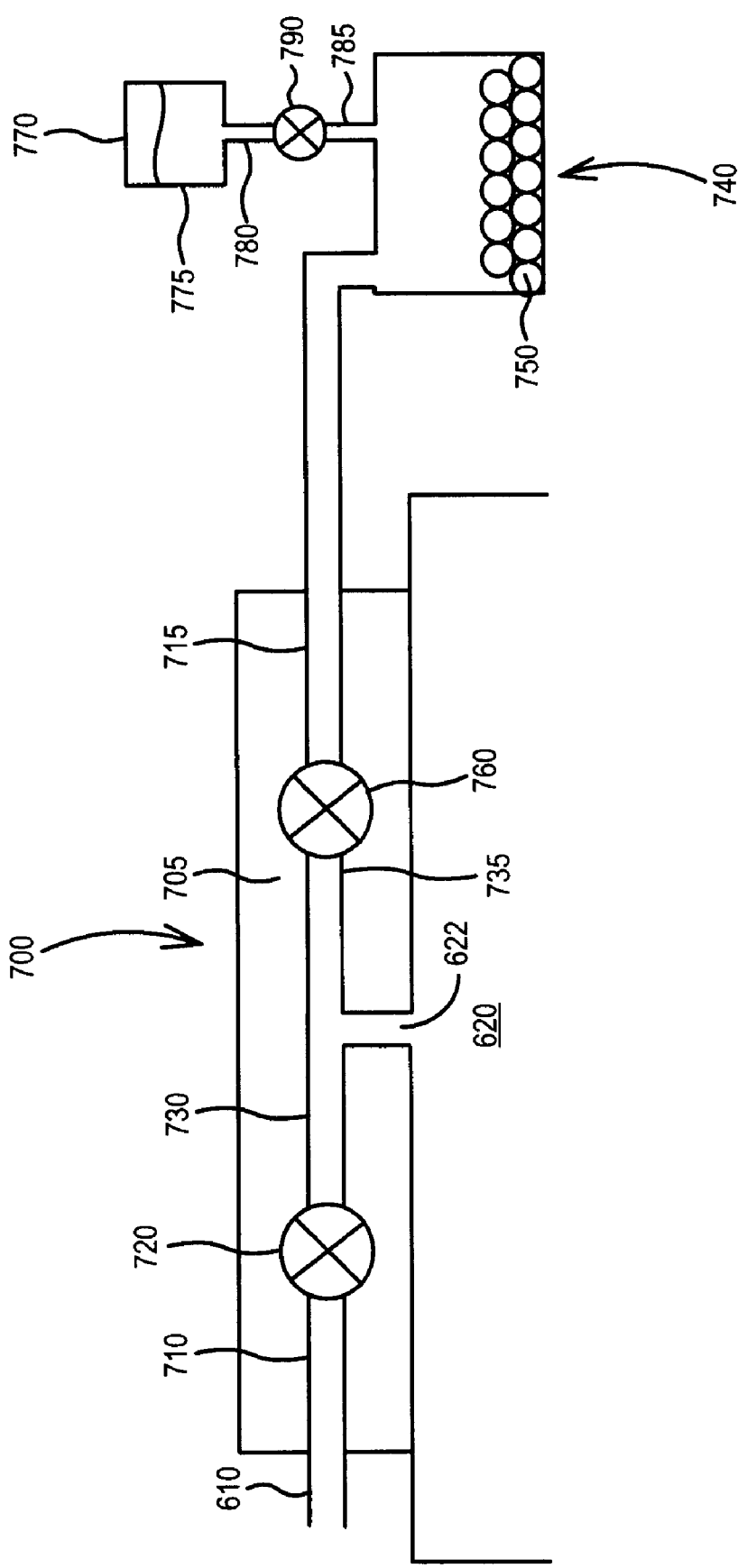
FIG. 7D is a cross-sectional view of a second embodiment of Applicant's fuel input assembly.

Referring now to FIG. 7D, in certain embodiments, fuel input assembly 700 further comprises an acetylene gas generator 740, wherein that acetylene generator provides acetylene gas to the intake manifold portion 622 of internal combustion engine 620. In embodiments, when starting Applicant's internal combustion engine utilizing a mixture of combustible gases comprising oxygen and hydrogen at levels in excess of ambient atmospheric levels, but not a mixture of hydrocarbon gases, electrical systems 640 and 670 are energized, such that electrical system 670 comprises power source 210, and electrical system 640 comprises power source 213 for electrolyzer 100. Electrolyzer 100 then begins to generate a combustible mixture of oxygen and hydrogen.

At the same time, valve 790 is caused to open such that water 775 from water reservoir 770 passes through conduit 780, valve 790, and conduit 785, and onto calcium carbide 750. The water reacts with the calcium carbide to generate acetylene gas. Valve 760 is then opened thereby allowing acetylene gas to pass from acetylene gas generator 740 through conduit 715, through valve 760, through conduit 735, and into fuel intake manifold 622. In these embodiments, Applicant's internal combustion engine 620 is started by the ignition of acetylene gas. As the quantity of combustible gases produced by electrolyzer 100 increases, valve 790 closes until the engine is operating exclusively using the mixture of combustible gases produced in electrolyzer 100.

In certain embodiments, Applicant's internal combustion engine 620 comprises a hybrid engine powered using the mixture of combustible gases produced by electrolyzer 100 in combination with a mixture of hydrocarbon fuels. In these embodiments, Applicant's hybrid engine is started using a mixture of hydrocarbon fuels. As the quantity of combustible gases produced by electrolyzer 100 increases, Applicant's engine is operated using both the mixture of combustible gases produced by electrolyzer 100 in combination with a mixture of hydrocarbon fuels.

Figure 8:
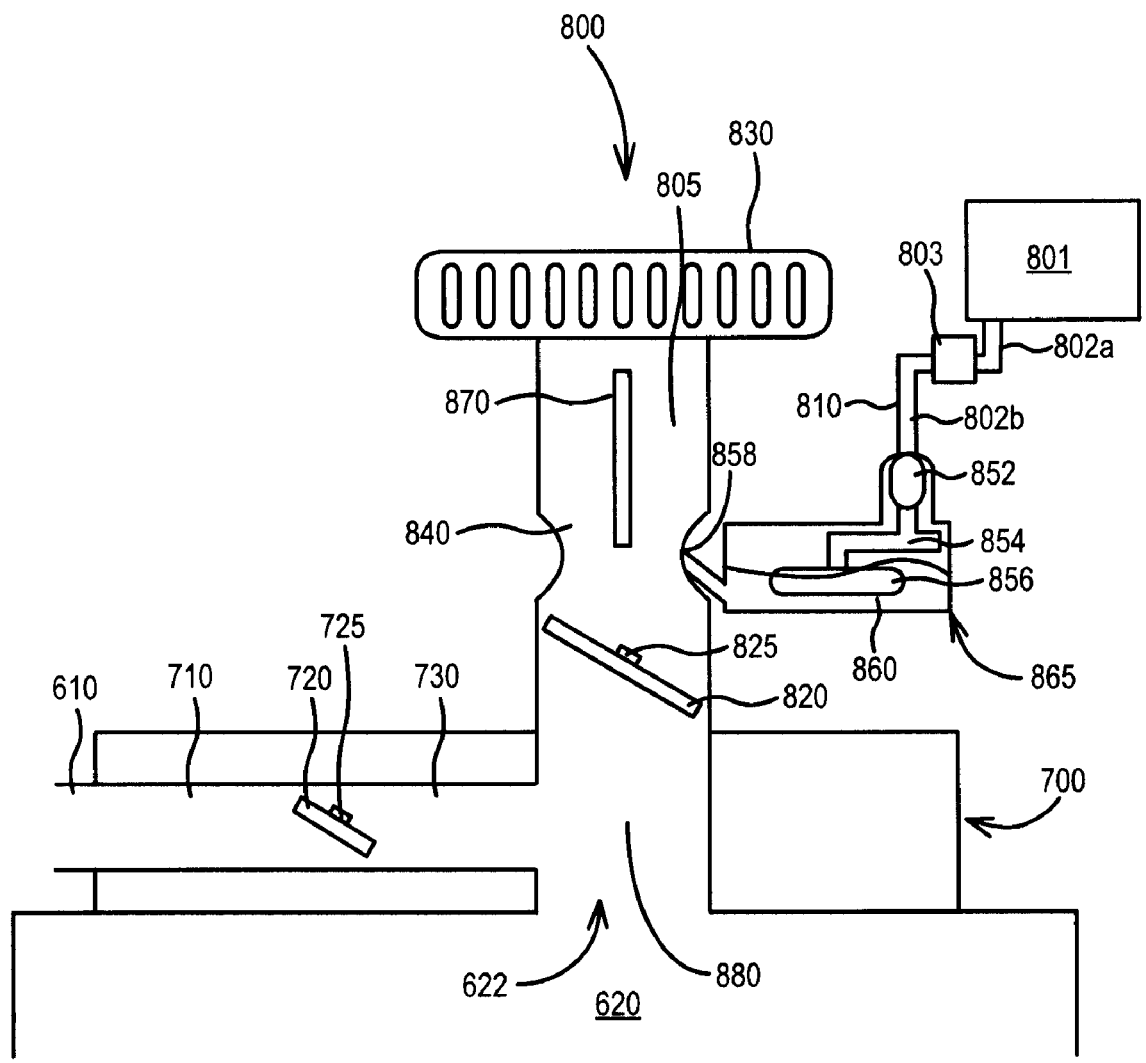
FIG. 8 is a cross-sectional view of a third embodiment of Applicant's fuel input assembly.

Referring now to FIG. 8, in these hybrid engine embodiments fuel input assembly 605 comprises fuel input assembly 800. Fuel input assembly 800 is disposed on engine 620, and comprises fuel mixing chamber 880 which communicates with an fuel intake manifold 622 disposed in engine 620.

Fuel input assembly 800 comprises the elements of fuel input assembly 700, wherein throttle position sensor 725 is disposed on throttle valve 720. In certain embodiments, throttle position sensor 725 is mounted on a rotatable member attached to throttle valve 720, wherein that rotatable member sets the position of throttle valve 720 within combustible gas conduit 710.

Fuel input assembly 800 further comprises hydrocarbon fuel input 810, air cleaner 830, choke 870, throttle valve 820, and throttle valve position sensor 825. In these embodiments, a mixture of liquid hydrocarbon fuel components 860 are stored in fuel tank 801. Fuel pump 803 provides hydrocarbon fuel via fuel lines 802*a* and 802*b* to hydrocarbon fuel input 810.

Hydrocarbon fuel 860 is disposed in float chamber 865. Float valve 852 in combination with float arm 854 and float 856 regulates the amount of hydrocarbon fuel 860 in float chamber 865. A vacuum produced by engine 620 pulls ambient air through air cleaner 830 and into air conduit 805. As ambient air is pulled through venturi section 840 of air conduit 805, hydrocarbon fuel 860 is injected through jet 858 into that air stream.

Throttle valve 820 regulates the amount of aerosolized hydrocarbon fuel passing into fuel mixing chamber 880. Throttle position sensor 825 is disposed on throttle valve 820. In certain embodiments, throttle position sensor 825 is mounted on a rotatable member attached to throttle valve 820, wherein that rotatable member sets the position of throttle valve 820 within conduit 805.

In certain embodiments, throttle valve 720 and throttle valve 820 are operatively coupled, such that both throttle valves open and close in unison. As those skilled in the art will appreciate, Applicant's vehicle 600/1000 comprises an accelerator. In certain embodiments, that accelerator comprises an accelerator pedal that is manually operated by the vehicle operator. When the accelerator pedal is depressed, throttle valve 720 opens to allow more combustible gas produced by electrolyzer 100 into the fuel intake manifold disposed in engine 620, and throttle valve 820 opens to allow more hydrocarbon fuel into the fuel intake manifold disposed in engine 620.

Figure 9A:
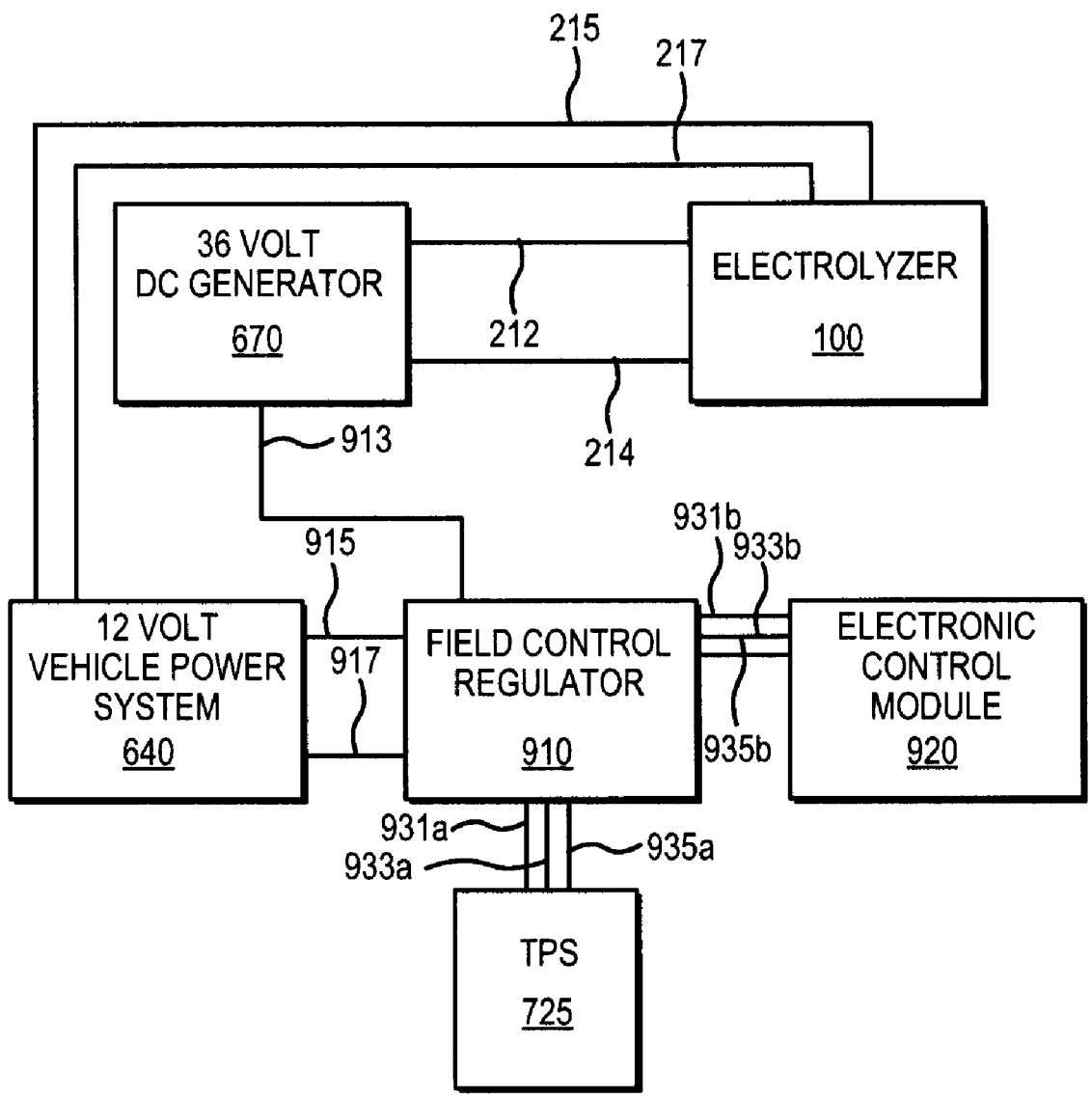
FIG. 9A is a block diagram showing certain elements of a first embodiment of the electrical system disposed in Applicant's vehicle.

Embodiments of Applicant's internal combustion engine 620, wherein that engine is powered only by the mixture of combustible gases produced by electrolyzer 100 utilize the control system illustrated in FIG. 9A. In the illustrated embodiment of FIG. 9A, vehicle electrical system 670 produces 36 volt DC power, and vehicle electrical system 670 comprises power source 210, wherein vehicle electrical system 670 is interconnected with electrolyzer 100 via power conduits 212 and 214. Vehicle electrical system 670 is interconnected with field control regulator 910 by communication link 913. Field control regulator 910 receives power from vehicle electrical system 640 via power conduits 915 and 917. The oscillator elements of Applicant's electrolysis apparatus 100 receive power from electrical system 640 via power conduits 215 and 217.

Electronic Control Module 920 needs to determine, inter alia, the position of throttle position sensor 725. As those skilled in the art will appreciate, Electronic Control Module 920 comprises a computing device that regulates the amount of fuel released into the intake manifold of engine 620.

Throttle position sensor 725 communicates with Electronic Control Module 920, via field control regulator 910, using communication links 931*a*/931*b*, 933*a*/933*b*, and 935*a*/935*b*. Throttle position sensor 725 is mounted on, or operatively coupled to, throttle valve 720, and converts the angle of throttle valve 720 into an electrical signal. In certain embodiments, throttle valve sensor 725 comprises a wiper arm connected to a rotatable member which rotates throttle valve 720. As the rotatable member moves, the wiper arm also moves. The wiper arm is connected to a resistor. As the wiper arm moves on the resistor, the signal voltage output changes. In the illustrated embodiment of FIG. 9A, five volts are supplied to throttle position sensor 725 via link 931*a*/931*b*. A throttle position sensor 725 voltage signal is output on link 933*a*/933*b*. Link 935*a*/935*b* comprises a ground wire.

Figure 9B:
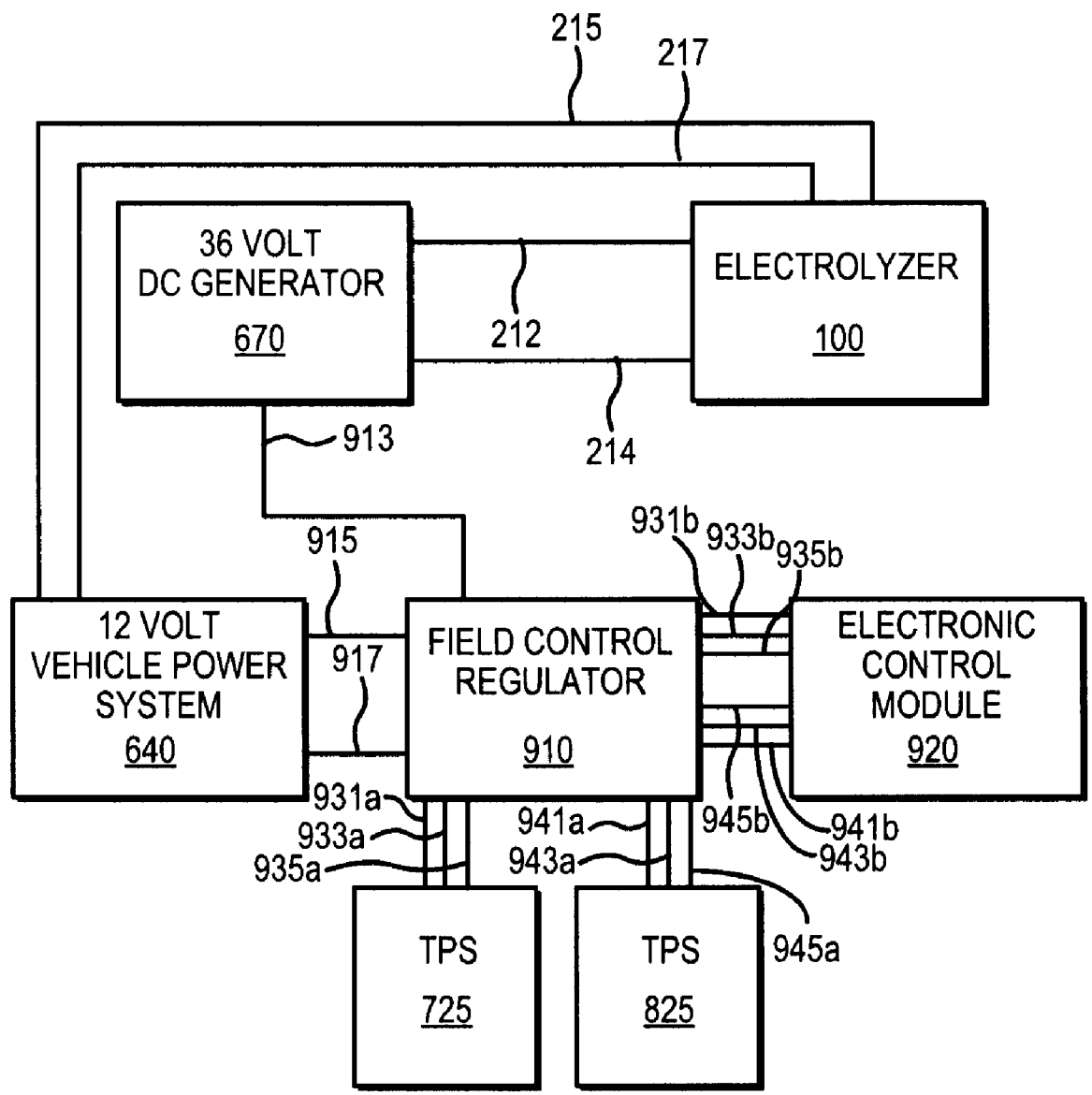
FIG. 9B is a block diagram showing certain elements of a second embodiment of the electrical system disposed in Applicant's vehicle.

Embodiments of Applicant's internal combustion engine 620, wherein that engine comprises fuel hybrid engine powered both by the mixture of combustible gases produced by electrolyzer 100, and using hydrocarbon fuels, utilize the control system illustrated in FIG. 9B. In the illustrated embodiment of FIG. 9B, vehicle electrical system 670 produces 36 volt DC power, wherein vehicle electrical system 670 comprises power source 210, and wherein vehicle electrical system 670 is interconnected with electrolyzer 100 via power conduits 212 and 214.

Vehicle electrical system 670 is interconnected with field control regulator 910 by communication link 913. Field control regulator 910 receives power from vehicle electrical system 640 via power conduits 915 and 917. The oscillator elements of Applicant's electrolysis apparatus receives power from electrical system 640 via power conduits 215 and 217.

Electronic Control Module 920 needs to determine, inter alia, the position of throttle valve 720 and throttle valve 820. As those skilled in the art will appreciate, Electronic Control Module 920 comprises a computing device that regulates the amount of fuel released into the intake manifold of engine 620.

Throttle position sensor 725 communicates with Electronic Control Module 920, via field control regulator 910, as described hereinabove. Throttle position sensor 825 communicates with Electronic Control Module 920, via field control regulator 910, using communication links 941a/941b, 943a/943b, and 945a/945b. Throttle position sensor 825 is mounted on, or operatively coupled to, throttle valve 820, and converts the angle of throttle valve 820 into an electrical signal. In certain embodiments, throttle valve sensor 825 comprises a wiper arm connected to a rotatable member which rotates throttle valve 820. As the rotatable member rotates, the wiper arm also moves. The wiper arm is connected to a resistor. As the wiper arm moves on the resistor, the signal voltage output changes. In the illustrated embodiment of FIG. 9B, five volts are supplied to throttle position sensor 825 via link 941a/941b. The throttle position sensor 825 voltage signal is output on link 943a/943b. Link 945a/945b comprises a ground wire.

While the preferred embodiments of the present invention have been illustrated in detail, it should be apparent that modifications and adaptations to those embodiments may occur to one skilled in the art without departing from the scope of the present invention as set forth in the following claims.

I claim:

1. An engine system, comprising:
    (a) an electrolysis apparatus comprising:
        an enclosure comprising a bottom, a plurality of walls attached to said bottom and having distal ends extending upwardly therefrom, and a top assembly removeably attached to each of the distal ends of said plurality of walls, wherein said bottom, plurality of walls, and top define an enclosed space;
        a first electrode disposed within said enclosed space;
        a second electrode disposed within said enclosed space;
        at least one electromagnetic energy radiator disposed within said enclosed space;
        an oscillator disposed external to said enclosure, wherein said oscillator is interconnected to said at least one electromagnetic energy radiator, wherein said at least one electromagnetic energy radiator emits electromagnetic energy having a frequency between 620 Hertz and 100,000 Hertz;
        a gas outlet in communication with and extending outwardly from said enclosure; and
    (b) an internal combustion engine, comprising:
        one or more combustion chambers;
        one or more pistons, wherein each of said one or more pistons is moveably disposed in a different one of said one or more combustion chambers;
        a crankshaft operatively coupled to each of said one or more pistons;
        a fuel intake manifold interconnected with said of said plurality of combustion cylinders;
        a fuel input assembly interconnected with said fuel intake manifold;
        a conduit interconnecting said gas outlet and said fuel input assembly;
        a first electrical power system operatively coupled to said crankshaft, wherein said first electrical power system is interconnected with said oscillator;
        a second electrical power system operatively coupled to said crankshaft, wherein said second electrical power system is interconnected with said first electrode such that said first electrode comprises a cathode, and wherein said second electrical power system is interconnected with said second electrode such that said second electrode comprises an anode.

2. The engine system of claim 1, wherein said first electrode is formed from a metal selected from the group consisting of nickel, tin, iron, lead, and combinations thereof.

3. The engine system of claim 1, wherein said first electrode comprises Nickel (III) oxide-hydroxide.

4. The engine system of claim 3, wherein said second electrode is formed from a metal selected from the group consisting of nickel, tin, iron, lead, and combinations thereof.

5. The engine system of claim 4, wherein said second electrode further comprises Nickel (III) oxide-hydroxide.

6. The engine system of claim 1, further comprising:
    a water input port interconnected to a water source and extending through said enclosure; and
    a float valve disposed within said enclosure, wherein said float valve assembly is in fluid communication with said water input port.

7. The engine system of claim 1, wherein said electrolysis apparatus comprises:
    (M) electromagnetic energy radiators, wherein (M) is greater than or equal to 2;
    (M) oscillators;
    wherein the (m)th electromagnetic energy radiator is interconnected with the (m)th oscillator, wherein (m) is greater than or equal to 1 and less than or equal to (M).

8. The engine system of claim 7, wherein (M) is 6.

9. A vehicle, comprising:
    (a) an electrolysis apparatus comprising:
        an enclosure comprising a bottom, a plurality of walls attached to said bottom and having distal ends extending upwardly therefrom, and a top assembly removeably attached to each of the distal ends of said plurality of walls, wherein said bottom, plurality of walls, and top define an enclosed space;
        a first electrode disposed within said enclosed space;
        a second electrode disposed within said enclosed space;
        at least one electromagnetic energy radiator disposed within said enclosed space;
        a power source disposed external to said enclosure, wherein said power source is interconnected with said first electrode such that said first electrode comprises a cathode, and wherein said power source is interconnected with said second electrode such that said second electrode comprises an anode;
        an oscillator disposed external to said enclosure, wherein said oscillator is interconnected to said electromagnetic energy radiator, wherein said at least one electromagnetic energy radiator emits electromagnetic energy having a frequency between 620 Hertz and 100,000 Hertz;
        a gas outlet in communication with and extending outwardly from said enclosure; and
    (b) an internal combustion engine, comprising:
        one or more combustion chambers;
        one or more pistons, wherein each of said one or more pistons is moveably disposed in a different one of said one or more combustion chambers;
        a crankshaft operatively coupled to each of said one or more pistons;

a fuel intake manifold interconnected with said of said plurality of combustion cylinders;

a fuel input assembly interconnected with said fuel intake manifold;

a first fuel conduit interconnecting said gas outlet and said fuel input assembly;

a first electrical power system operatively coupled to said crankshaft, wherein said first electrical power system is interconnected with said oscillator;

a second electrical power system operatively coupled to said crankshaft, wherein said second electrical power system is interconnected with said first electrode such that said first electrode comprises a cathode, and wherein said second electrical power system is interconnected with said second electrode such that said second electrode comprises an anode.

(c) a plurality of wheels;

(d) a transmission operatively coupled to said crankshaft and to one or more of said plurality of wheels.

10. The vehicle of claim 9, wherein said first electrode is formed from a metal selected from the group consisting of nickel, tin, iron, lead, and combinations thereof.

11. The vehicle of claim 10, wherein said first electrode comprises Nickel (III) oxide-hydroxide.

12. The vehicle of claim 9, wherein said second electrode is formed from a metal selected from the group consisting of nickel, tin, iron, lead, and combinations thereof.

13. The vehicle of claim 12, wherein said second electrode further comprises Nickel (III) oxide-hydroxide.

14. The vehicle of claim 9, further comprising:
a water input port interconnected to a water source and extending through said enclosure; and
a float valve disposed within said enclosure, wherein said float valve assembly is in fluid communication with said water input port.

15. The vehicle of claim 9, wherein said electrolysis apparatus comprises:
(M) electromagnetic energy radiators, wherein (M) is greater than or equal to 2;
(M) oscillators;
wherein the (m)th electromagnetic energy radiator is interconnected with the (m)th oscillator, wherein (m) is greater than or equal to 1 and less than or equal to (M).

16. The vehicle system of claim 15, wherein (M) is 6.

17. The vehicle of claim 9, further comprising:
a fuel tank;
a mixture of liquid hydrocarbon compounds disposed in said fuel tank;
wherein said fuel input assembly further comprises:
an air conduit;
a hydrocarbon fuel jet extending into said air conduit;
a float chamber interconnected to said fuel jet;
a second fuel conduit interconnecting fuel tank and said float chamber.

18. The vehicle of claim 17, further comprising:
a fuel pump, wherein said fuel pump is interconnected with said second conduit.

19. A vehicle, comprising:
(a) an electrolysis apparatus comprising:
an enclosure comprising a bottom, a plurality of walls attached to said bottom and having distal ends extending upwardly therefrom, and a top assembly removeably attached to each of the distal ends of said plurality of walls, wherein said bottom, plurality of walls, and top define an enclosed space;
a first electrode disposed within said enclosed space;
a second electrode disposed within said enclosed space;
at least one electromagnetic energy radiator disposed within said enclosed space;
a power source disposed external to said enclosure, wherein said power source is interconnected with said first electrode such that said first electrode comprises a cathode, and wherein said power source is interconnected with said second electrode such that said second electrode comprises an anode;
an oscillator disposed external to said enclosure, wherein said oscillator is interconnected to said at least one electromagnetic energy radiator, wherein said at least one electromagnetic energy radiator emits electromagnetic energy having a frequency between 620 Hertz and 100,000 Hertz;
a gas outlet in communication with and extending outwardly from said enclosure; and
(b) an internal combustion engine, comprising:
one or more combustion chambers;
one or more pistons, wherein each of said one or more pistons is moveably disposed in a different one of said one or more combustion chambers;
a crankshaft operatively coupled to each of said one or more pistons;
a fuel intake manifold interconnected with said of said plurality of combustion cylinders;
a fuel input assembly interconnected with said fuel intake manifold;
a first conduit interconnecting said gas outlet and said fuel input assembly;
a first electrical power system operatively coupled to said crankshaft, wherein said first electrical power system is interconnected with said oscillator;
a second electrical power system operatively coupled to said crankshaft, wherein said second electrical power system is interconnected with said first electrode such that said first electrode comprises a cathode, and wherein said second electrical power system is interconnected with said second electrode such that said second electrode comprises an anode.

(c) a plurality of wheels;

(d) a first transmission operatively coupled to said crankshaft and to one or more of said plurality of wheels;

(e) an electric motor;

(f) a battery pack interconnected to said first electrical system (g) a second transmission operatively coupled to said electric motor and to one or more of said plurality of wheels.

20. The vehicle of claim 19, wherein said first electrode is formed from a metal selected from the group consisting of nickel, tin, iron, lead, and combinations thereof.

21. The vehicle of claim 20, wherein said second electrode is formed from a metal selected from the group consisting of nickel, tin, iron, lead, and combinations thereof.

22. The vehicle of claim 19, further comprising:
a water input port interconnected to a water source and extending through said enclosure; and
a float valve disposed within said enclosure, wherein said float valve assembly is in fluid communication with said water input port.

23. The vehicle of claim 19, wherein said electrolysis apparatus comprises:
(M) electromagnetic energy radiators, wherein (M) is greater than or equal to 2;
(M) oscillators;
wherein the (m)th electromagnetic energy radiator is interconnected with the (m)th oscillator, wherein (m) is greater than or equal to 1 and less than or equal to (M).

24. The vehicle of claim 19, further comprising:
a fuel tank;
a mixture of liquid hydrocarbon compounds disposed in said fuel tank;
wherein said fuel input assembly further comprises:
an air conduit;
a hydrocarbon fuel jet extending into said air conduit;
a float chamber interconnected to said fuel jet;
a second fuel conduit interconnecting fuel tank and said float chamber.

25. The vehicle of claim 24, further comprising:
a fuel pump, wherein said fuel pump is interconnected with said second conduit.

* * * * *